(12) United States Patent
Inaguma

(10) Patent No.: US 9,737,885 B2
(45) Date of Patent: Aug. 22, 2017

(54) STRUCTURE FOR FORMING CARBON NANOFIBER, CARBON NANOFIBER STRUCTURE AND METHOD FOR PRODUCING SAME, AND CARBON NANOFIBER ELECTRODE

(71) Applicant: FUJIKURA LTD., Koto-ku, Tokyo (JP)

(72) Inventor: Masayasu Inaguma, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 14/209,354

(22) Filed: Mar. 13, 2014

(65) Prior Publication Data

US 2014/0227481 A1 Aug. 14, 2014

Related U.S. Application Data

(63) Continuation of application No. PCT/JP2012/073489, filed on Sep. 13, 2012.

(30) Foreign Application Priority Data

Sep. 14, 2011 (JP) ................................ 2011-201181

(51) Int. Cl.
*B32B 3/24* (2006.01)
*B01J 35/00* (2006.01)
(Continued)

(52) U.S. Cl.
CPC .............. *B01J 35/002* (2013.01); *B82Y 30/00* (2013.01); *B82Y 40/00* (2013.01); *C01B 31/0233* (2013.01); *D01F 9/127* (2013.01); *H01G 9/042* (2013.01); *H01G 9/2045* (2013.01); *C01B 31/022* (2013.01); *C01B 2202/08* (2013.01); *C01B 2202/34* (2013.01); *C01B 2202/36* (2013.01); *C01B 2203/1041* (2013.01); *C01B 2203/1047* (2013.01); *C01B 2203/1064* (2013.01); *C01B 2203/1082* (2013.01);
(Continued)

(58) Field of Classification Search
None
See application file for complete search history.

(56) References Cited

U.S. PATENT DOCUMENTS 5,232,890 A * 8/1993 Ganguli ............... B01D 53/945
502/304
7,288,321 B2 * 10/2007 Liu ....................... B82Y 30/00
423/447.3
(Continued)

FOREIGN PATENT DOCUMENTS

EP 1061041 A1 * 12/2000 .............. B01J 23/26
JP 2002-518280 A 6/2002
(Continued)

OTHER PUBLICATIONS

Mazchine Translation of JP 2010248006 A, Nov. 2010.*
Arcos et al., Strong influence of buffer layer type on carbon nanotube characteristics, 2004 (no month), Carbon, vol. 42, Issue 1, pp. 187-190.*
Supplementary European Search Report issued Apr. 30, 2015 in European Patent Application No. 12832225.2.
(Continued)

Primary Examiner — Jeff Vonch
(74) Attorney, Agent, or Firm — Sugrue Mion, PLLC

(57) ABSTRACT

Provided is a structure for forming carbon nanofiber, including a base material containing an oxygen ion-conductive oxide, and a metal catalyst that is provided on one surface side of the base material.

18 Claims, 19 Drawing Sheets

(51) Int. Cl.

| | |
|---|---|
| C01B 31/02 | (2006.01) |
| B82Y 30/00 | (2011.01) |
| B82Y 40/00 | (2011.01) |
| H01G 9/042 | (2006.01) |
| B82Y 99/00 | (2011.01) |
| C23C 16/26 | (2006.01) |
| D01F 9/127 | (2006.01) |
| H01G 9/20 | (2006.01) |
| H01M 4/583 | (2010.01) |
| H01M 4/90 | (2006.01) |

(52) U.S. Cl.
CPC .......... H01M 4/583 (2013.01); H01M 4/9075 (2013.01); Y10S 977/742 (2013.01); Y10S 977/843 (2013.01); Y10S 977/932 (2013.01); Y10S 977/942 (2013.01); Y10T 428/1266 (2015.01); Y10T 428/12611 (2015.01); Y10T 428/12667 (2015.01); Y10T 428/24322 (2015.01); Y10T 428/24331 (2015.01); Y10T 428/24612 (2015.01); Y10T 428/249921 (2015.04); Y10T 428/249924 (2015.04); Y10T 428/25 (2015.01); Y10T 428/265 (2015.01); Y10T 428/30 (2015.01)

(56) References Cited

U.S. PATENT DOCUMENTS

| | | | | |
|---|---|---|---|---|
| 7,504,355 | B2* | 3/2009 | Carter | B01J 23/40 502/300 |
| 2002/0160111 | A1* | 10/2002 | Sun | B82Y 10/00 427/248.1 |
| 2002/0168525 | A1* | 11/2002 | Han | B82Y 10/00 428/408 |
| 2003/0116503 | A1* | 6/2003 | Wang | B01D 69/141 210/660 |
| 2003/0147801 | A1* | 8/2003 | Someya | B82Y 30/00 423/447.3 |
| 2003/0148097 | A1* | 8/2003 | Takikawa | B82Y 30/00 428/364 |
| 2003/0203139 | A1* | 10/2003 | Ren | B82Y 10/00 428/34.3 |
| 2004/0053053 | A1* | 3/2004 | Jiang | B82Y 30/00 428/408 |
| 2004/0058153 | A1* | 3/2004 | Ren | B01J 23/76 428/408 |
| 2004/0166235 | A1 | 8/2004 | Fujii et al. | |
| 2005/0075708 | A1* | 4/2005 | O'Brien | A61N 1/05 607/116 |
| 2006/0239893 | A1* | 10/2006 | Zhang | B01J 23/881 423/445 R |
| 2006/0239894 | A1* | 10/2006 | Kurachi | B82Y 30/00 423/445 R |
| 2006/0290003 | A1 | 12/2006 | Kawabata et al. | |
| 2007/0116631 | A1* | 5/2007 | Li | B82Y 30/00 423/447.3 |
| 2007/0218202 | A1* | 9/2007 | Ajayan | B82Y 30/00 427/249.1 |
| 2007/0224107 | A1* | 9/2007 | Hikata | B01J 23/8906 423/460 |
| 2008/0014443 | A1* | 1/2008 | Zakhidov | B81C 1/00111 428/408 |
| 2008/0105982 | A1* | 5/2008 | Horibe | B82Y 10/00 257/764 |
| 2008/0181839 | A1* | 7/2008 | Arendt | B82Y 30/00 423/447.2 |
| 2009/0130386 | A1* | 5/2009 | Golovchenko | B82Y 10/00 428/138 |
| 2009/0136751 | A1* | 5/2009 | Zhu | B82Y 30/00 428/367 |
| 2009/0272935 | A1* | 11/2009 | Hata | B01J 20/20 252/70 |
| 2009/0311166 | A1* | 12/2009 | Hart | B82B 1/00 423/445 B |
| 2010/0062229 | A1* | 3/2010 | Hata | B82Y 30/00 428/195.1 |
| 2010/0196600 | A1 | 8/2010 | Shibuya et al. | |
| 2010/0285271 | A1* | 11/2010 | Davis | B81C 1/00031 428/131 |
| 2011/0183206 | A1* | 7/2011 | Davis | B82Y 30/00 429/218.1 |
| 2012/0045572 | A1* | 2/2012 | Imanishi | B82Y 30/00 427/122 |
| 2012/0220106 | A1* | 8/2012 | Matsumoto | B82Y 30/00 438/478 |
| 2012/0241327 | A1* | 9/2012 | Suib | B82Y 40/00 205/462 |
| 2012/0315467 | A1* | 12/2012 | Lafdi | C01B 31/0206 428/335 |
| 2013/0045157 | A1* | 2/2013 | Brambilla | C01B 31/0226 423/447.3 |
| 2013/0112610 | A1* | 5/2013 | Davis | B01D 71/021 210/321.6 |
| 2013/0337707 | A1* | 12/2013 | Hata | C01B 31/00 442/1 |
| 2014/0339168 | A1* | 11/2014 | Hong | B01D 69/147 210/651 |

FOREIGN PATENT DOCUMENTS

| | | | |
|---|---|---|---|
| JP | 2004-281388 A | 10/2004 | |
| JP | 2005112659 A | * 4/2005 | |
| JP | 2006-100778 | 4/2006 | |
| JP | 2007-145634 A | 6/2007 | |
| JP | 2007252970 A | * 10/2007 | |
| JP | 2009-021038 | 1/2009 | |
| JP | 2009-227470 | 10/2009 | |
| JP | 2010-241661 A | 10/2010 | |
| JP | 2010-248006 | 11/2010 | |
| JP | 2010-248007 A | 11/2010 | |
| JP | 2010-254531 | 11/2010 | |
| JP | 2011-068501 | 4/2011 | |
| TW | 200301785 | 7/2003 | |
| WO | 99/65821 A1 | 12/1999 | |
| WO | WO 2008008108 A2 | * 1/2008 | B82Y 30/00 |
| WO | 2010/116238 A2 | 10/2010 | |

OTHER PUBLICATIONS

Ferlauto A S et al: "Chemical vapor deposition of multi-walled carbon nanotubes from nickel/yttria-stabilized zirconia catalysts", Applied Physics A; Materials Science & Processing, Springer,Berin, DE, vol. 84, No. 3, Jun. 2, 2006, pp. 271-276.

Shunsuke Kurasawa et al: "Synthesis of carbon nanotubes by the catalytic decomposition of methane on ni-based catalysts", Molecular Crystals and Liquid Crystals, vol. 387, No. 1, Oct. 18, 2010, pp. 123-128.

Japanese Office Action dated Nov. 4, 2014 in Japanese Patent Application No. 2011-201182.

Japanese Office Action dated Nov. 4, 2014 in Japanese Patent Application No. 2011-201183.

Japanese Office Action dated Nov. 25, 2014 in Japanese Patent Application No. 2013-533711.

Taiwanese Office Action issued Apr. 24, 2015 in Taiwanese Patent Application No. 101133806.

Rong Xiang, et al., "Growth Deceleration of Vertically Aligned Carbon Nanotube Arrays: Catalyst Deactivation or Feedstock Diffusion Controlled", Journal of Physical Chemistry C, 2008, pp. 4892-4896, vol. 112.

Chinese Office Action issued Feb. 28, 2015 in Chinese Patent Application No. 201280044387.X.

* cited by examiner

STRUCTURE FOR FORMING CARBON NANOFIBER, CARBON NANOFIBER STRUCTURE AND METHOD FOR PRODUCING SAME, AND CARBON NANOFIBER ELECTRODE

CROSS REFERENCE TO RELATED APPLICATIONS

This application is a Continuation of National Stage of International Application No. PCT/JP2012/73489 filed Sep. 13, 2012, claiming priority based on Japanese Patent Application No. 2011-201181 filed Sep. 14, 2011, the contents of all of which are incorporated herein by reference in their entirety.

TECHNICAL FIELD

The present invention relates to a structure for forming carbon nanofiber, a carbon nanofiber structure and a method for producing the structure, and a carbon nanofiber electrode.

BACKGROUND ART

Attention has been paid to carbon nanotube electrodes as electrodes or electric wires for dye-sensitized solar cells, lithium ion secondary batteries, lithium ion capacitors, electric double layer capacitors, fuel cells and the like, since these electrodes have excellent conductivity.

In dye-sensitized solar cells in particular, there are increasing expectations for carbon nanotube electrodes since these electrodes exhibit a performance comparable to platinum electrodes.

The carbon nanotubes of a carbon nanotube electrode are usually obtained by growing carbon nanotubes by chemical vapor deposition on the catalyst of a structure for forming carbon nanotube that is formed by supporting a catalyst on a substrate. Here, from the viewpoint of enhancing the performance of the electrode, it is preferable that the carbon nanotubes be long. Furthermore, from the viewpoint of enhancing the productivity of carbon nanotubes, it is preferable that the amount of growth of carbon nanotubes per unit time be larger.

As a production method for carbon nanotubes involving growing of long carbon nanotubes, for example, the production method described in Patent Document 1 is known. In the production method described in Patent Document 1, for example, a structure for forming carbon nanotube in which the substrate is formed from silicon and the catalyst is formed from iron, is used. Furthermore, it has been suggested to obtain carbon nanotubes having markedly increased heights, by using an oxidizing gas when carbon nanotubes are grown, removing the carbon attached to the catalyst by means of this oxidizing gas, and thereby sustaining the activity of the catalyst.

CITATION LIST

Patent Document

Patent Document 1: Japanese Patent Application Laid-Open (JP-A) No. 2007-145634

SUMMARY OF INVENTION

Problem to be Solved by the Invention

However, in the method for producing carbon nanotubes described in Patent Document 1, the carbon nanotubes could not be sufficiently grown.

The present invention was achieved under such circumstances, and an object of the present invention is to provide a structure for forming carbon nanofiber, which is capable of sufficiently growing carbon nanofibers such as carbon nanotubes, a carbon nanofiber structure and a method for producing a carbon nanofiber structure, and a carbon nanofiber electrode.

Means for Solving Problem

The inventor of the present invention conducted a thorough investigation in order to solve the problems described above, and as a result, the inventor contemplated as follows for the reason why carbon nanotubes cannot be sufficiently grown by the production method described in Patent Document 1. That is, in the production method described in Patent Document 1, since an oxidizing gas is used to grow carbon nanotubes, it becomes gradually difficult for the oxidizing gas to be brought into contact with the catalyst, along with the growth of the carbon nanotubes. Thus, the inventor thought that as a result, the catalyst is gradually deactivated, and thereby, the carbon nanotubes cannot be sufficiently grown. Thus, the inventor further conducted an extensive study, and as a result, they found that the problems described above can be solved by incorporating an oxygen ion-conductive oxide into the base material when carbon nanotubes are grown. The inventor thus completed the present invention.

That is, the present invention is a structure for forming carbon nanofiber, which includes a base material including an oxygen ion-conductive oxide, and a metal catalyst provided on one surface side of the base material.

According to this structure for forming carbon nanofiber, on the occasion in which carbon nanofibers are grown by a chemical vapor deposition method (hereinafter, may be referred to as "CVD method") on a metal catalyst of the structure for forming carbon nanofiber, a raw material gas containing carbon is used. At this time, since the base material is usually heated to a temperature of the extent that oxygen ions can migrate, oxygen ions in the base material are conducted through the base material and reach the metal catalyst. As a result, even if carbon nanofibers are grown, oxygen can be sufficiently supplied to the metal catalyst, and thus deactivation of the metal catalyst can be sufficiently suppressed. Therefore, when the structure for forming carbon nanofiber of the present invention is used, carbon nanofibers can be sufficiently grown.

Furthermore, according to this structure for forming carbon nanofiber, on the occasion in which carbon nanofibers are grown by a CVD method on the metal catalyst of the structure for forming carbon nanofiber, when the base material is heated to a temperature of the extent that oxygen ions can migrate, oxygen ions in the base material are conducted through the base material and reach the metal catalyst. Furthermore, when a gas containing oxygen molecules is supplied through the surface on the opposite side of the metal catalyst in the base material, the oxygen molecules included in the gas containing oxygen molecules are more effectively supplied as oxygen ions to the metal catalyst through the base material. Therefore, cementation or deposition of carbon materials on the metal catalyst can be sufficiently suppressed, and carbon nanofibers can be sufficiently grown. In addition, since oxygen deficiency in the base material is sufficiently suppressed, a decrease in the strength of the base material caused by significant oxygen deficiency in the base material can also be suppressed.

The structure for forming carbon nanofiber described above preferably further includes a metal oxide layer formed of a metal oxide, between the one surface of the base material and the metal catalyst.

According to this structure for forming carbon nanofiber, when carbon nanofibers are grown by a CVD method on the metal catalyst of the structure for forming carbon nanofiber, a raw material gas containing carbon is used. At this time, since the base material is usually heated to a temperature of the extent that oxygen ions can migrate, oxygen ions in the base material are conducted through the base material and reach the metal oxide layer. Therefore, even if cementation occurs in the metal oxide layer due to the raw material gas containing carbon, or carbon materials deposit on the surface of the metal oxide layer due to secondary reaction products of the raw material gas, the oxygen ions that have reached the metal oxide layer react with these carbons and form $CO_2$ and the like, and thereby, cementation or deposition of carbon materials can be sufficiently suppressed. Therefore, a decline in the catalyst supporting function of the metal oxide layer can be sufficiently suppressed, and carbon nanofibers can be grown more satisfactorily.

Furthermore, according to this structure for forming carbon nanofiber, on the occasion in which carbon nanofibers are grown by a CVD method on the metal catalyst of the structure for forming carbon nanofiber, when the base material is heated to a temperature of the extent that oxygen ions can migrate, oxygen ions in the base material are conducted through the base material and reach the metal oxide layer. Furthermore, when a gas containing oxygen molecules is supplied through the surface on the opposite side of the metal oxide layer in the base material, oxygen molecules included in the gas containing oxygen molecules are supplied as oxygen ions more effectively to the metal oxide layer through the base material. Accordingly, cementation or deposition of carbon materials in the metal oxide layer can be sufficiently suppressed. Therefore, a decrease in the catalyst supporting function of the metal oxide layer can be more sufficiently suppressed, and carbon nanofibers can be grown more satisfactorily.

In the structure for forming carbon nanofiber, it is preferable that the metal oxide be aluminum oxide.

In this case, carbon nanofibers can be grown more satisfactorily as compared with the case in which the metal oxide is a metal oxide other than aluminum oxide.

In the structure for forming carbon nanofiber further including the metal oxide layer mentioned above, it is preferable that the thickness of at least a portion of the metal oxide layer be 0.5 nm to 10 nm.

According to this structure for forming carbon nanofiber, when carbon nanofibers are grown by a CVD method on the metal catalyst of the structure for forming carbon nanofiber, carbon nanofibers can be grown more satisfactorily in an area of the metal oxide layer where the thickness is 0.5 nm to 10 nm.

In the structure for forming carbon nanofiber, it is preferable that the thickness of at least a portion of the metal oxide layer be 1 nm to 8 nm.

In this case, carbon nanofibers can be grown more satisfactorily in an area of the metal oxide layer where the thickness is 1 nm to 8 nm, as compared with the case in which the thickness of at least a portion of the metal oxide layer is not in the range described above.

In the structure for forming carbon nanofiber, a portion of the metal oxide layer may comprise plural thinner sections, each having a thickness of 0.5 nm to 10 nm and being provided to be separated apart from each other, and the remaining portion may comprise a thicker section having a thickness of more than 10 nm.

In this case, carbon nanofibers can be grown more satisfactorily in the thinner sections than in the thicker section. Therefore, carbon nanofibers can be made to protrude more on the metal catalyst provided on each of the plural thinner sections, than on the metal catalyst provided on the thicker section. In this case, since gaps are formed in between the carbon nanofibers that have grown on the metal catalyst provided on each of the plural thinner sections, when a raw material gas is supplied for the growth of the carbon nanofibers, the raw material gas can penetrate into the gaps. Accordingly, as compared with the case in which plural thinner sections gather together into one group (case in which the plural thinner sections are not separated apart from each other), the raw material gas can be supplied more sufficiently to the metal catalyst provided on each of the plural thinner sections. As a result, the unevenness of length of the carbon nanofibers in the respective sections of the plural thinner sections can be made sufficiently small. Furthermore, there is a tendency that when one strand of carbon nanofiber is pulled out from each of the plural thinner sections, other carbon nanofibers are pulled out in the form of being connected in series to the foregoing carbon nanofiber. Therefore, one strand of high strength fiber can be easily formed by intertwining the carbon nanofibers pulled out from the respective sections of the plural thinner sections.

In the structure for forming carbon nanofiber, it is preferable that the metal catalyst be provided directly on one surface of the base material.

In this case, when carbon nanofibers are grown by a CVD method on the metal catalyst of the structure for forming carbon nanofiber, it becomes easier for oxygen ions in the base material to be conducted through the base material and reach the metal catalyst. As a result, even if carbon nanofibers grow, oxygen can be supplied more sufficiently to the metal catalyst, and deactivation of the metal catalyst can be suppressed more satisfactorily. Therefore, according to the structure for forming carbon nanofiber of the present invention, carbon nanofibers can be grown more satisfactorily.

In the structure for forming carbon nanofiber, it is preferable that the metal catalyst be at least one selected from the group consisting of V, Mo, Fe, Co, Ni, Pd, Pt, Rh, Ru and W.

In this case, the productivity of carbon nanofibers is further increased. That is, carbon nanofibers can be grown more effectively.

The present invention is a carbon nanofiber structure obtainable by growing carbon nanofibers by supplying a raw material gas containing carbon to the structure for forming carbon nanofiber by a CVD method.

Since this carbon nanofiber structure has sufficiently grown carbon nanofibers, the carbon nanofiber structure is useful for forming electrodes or electric wires for dye-sensitized solar cells, lithium ion secondary batteries, lithium ion capacitors, electric double layer capacitors, fuel cells and the like.

Furthermore, it is preferable that the carbon nanofiber structure be a carbon nanofiber structure obtainable by growing carbon nanofibers by supplying a gas containing oxygen molecules to the structure for forming carbon nanofiber through the surface on the opposite side of the metal catalyst in the base material.

Since this carbon nanofiber structure has more sufficiently grown carbon nanofibers, the carbon nanofiber structure is highly useful for forming electrodes or wires for dye-sensitized solar cells, lithium ion secondary batteries, lithium ion capacitors, electric double layer capacitors, fuel cells and the like.

Furthermore, the present invention is a carbon nanofiber structure including the structure for forming carbon nanofiber described above; and a carbon nanofiber aggregate layer that is provided on the side of the one surface side of the base material of the structure for forming carbon nanofiber so as to interpose at least the metal catalyst between the carbon nanofiber aggregate layer and the one surface, and is formed by aggregating plural strands of carbon nanofibers which are oriented along a direction away from the one surface, wherein holes each having a hole diameter of 0.3 µm to 7 µm are formed by being surrounded by the plural strands of carbon nanofibers and in the carbon nanofiber aggregate layer, the total area of the holes is more than or equal to 1% and less than 40% relative to the apparent area of the end surface on the opposite side of the base material in the carbon nanofiber aggregate layer.

According to this carbon nanofiber structure, in the carbon nanofiber aggregate layer that is provided on one surface side of the base material, holes each having a hole diameter of 0.3 µm to 7 µm are appropriately formed by being surrounded by plural strands of carbon nanofibers. Therefore, for example, when an electrode of an electrochemical device containing an electrolyte is formed from the relevant carbon nanofiber structure, the electrolyte can be easily and effectively transported to the interior of the carbon nanofiber aggregate layer through the holes. Therefore, the carbon nanofiber structure of the present invention can form a carbon nanofiber electrode capable of imparting excellent electrochemical performance to electrochemical devices. Furthermore, the carbon nanofiber structure of the present invention has, on one surface side of the base material, a carbon nanofiber aggregate layer that is formed by aggregating plural strands of carbon nanofibers, and in this carbon nanofiber aggregate layer, holes are formed by being surrounded by plural strands of carbon nanofibers. That is, these holes do not compartmentalize the carbon nanofiber aggregate layer. Therefore, when a carbon yarn formed by continuously joining plural strands of carbon nanofibers is pulled out from the carbon nanofiber aggregate layer, a longer carbon yarn can be obtained.

The carbon nanofiber structure is useful when the length of the carbon nanofiber is larger than the maximum value of the hole diameters of the holes.

This is because as the length along the direction of orientation of the carbon nanofibers is larger than the maximum value of the hole diameters of the holes, there is an increasing necessity for transporting the electrolyte to the interior of the carbon nanofiber aggregate layer in order to enhance the electrochemical performance of electrochemical devices.

In the carbon nanofiber structure, it is preferable that the holes be through-holes. In this case, when the carbon nanofiber structure of the present invention is applied to an electrode of an electrochemical device, the electrolyte can be more sufficiently transported to the interior of the carbon nanofiber aggregate layer as compared with the case in which the holes are not through-holes. As a result, the carbon nanofiber structure of the present invention can impart more excellent electrochemical performance to the electrochemical device.

Furthermore, the present invention is a carbon nanofiber electrode obtainable by transferring the carbon nanofiber aggregate layer of the carbon nanofiber structure to a conductive substrate.

According to this carbon nanofiber electrode, when the carbon nanofiber electrode is used as an electrode of an electrochemical device which includes an electrolyte, the electrolyte can be easily and effectively transported to the interior of the carbon nanofiber aggregate layer through the holes. Therefore, when the carbon nanofiber electrode of the present invention is applied to an electrode of an electrochemical device, excellent electrochemical performance can be imparted to the electrochemical device.

The present invention is a method for producing a carbon nanofiber structure, the method including a carbon nanofiber growing step of growing carbon nanofibers by a CVD method on the metal catalyst of the structure for forming carbon nanofiber, and thereby obtaining a carbon nanofiber structure, wherein the carbon nanofiber growing step is carried out by supplying a raw material gas containing carbon.

According to this production method, carbon nanofibers are grown by a CVD method on a structure for forming carbon nanofiber. At this time, a raw material gas containing carbon is supplied to the structure for forming carbon nanofiber. At this time, since the base material is heated to a temperature of the extent that oxygen ions can migrate, oxygen ions in the base material are conducted through the base material and reach the metal catalyst. As a result, even if carbon nanofibers grow, oxygen can be supplied sufficiently to the metal catalyst, and deactivation of the metal catalyst can be sufficiently suppressed. Therefore, according to the structure for forming carbon nanofiber of the present invention, carbon nanofibers can be grown satisfactorily.

In the carbon nanofiber growing step, it is preferable to supply a gas containing oxygen molecules to the base material of the structure for forming carbon nanofiber through the surface on the opposite side of the metal catalyst.

According to this production method, carbon nanofibers are grown by a CVD method on a structure for forming carbon nanofiber. At this time, a raw material gas containing carbon is supplied to the structure for forming carbon nanofiber. At this time, since the base material is heated to a temperature of the extent that oxygen ions can migrate, oxygen ions in the base material are conducted through the base material and reach the metal catalyst. Furthermore, in the production method, since a gas containing oxygen molecules, not an oxidizing gas that does not contain oxygen molecules, is supplied through the surface on the opposite side of the metal catalyst in the base material, the amount of oxygen ions supplied to the metal catalyst can be controlled. Therefore, even if cementation occurs on the metal catalyst by the raw material gas containing carbon, or carbon materials are deposited on the surface of the metal catalyst by secondary reaction products of the raw material gas, oxygen ions that have reached the metal catalyst react with these carbons and form $CO_2$ and the like. Therefore, cementation or deposition of carbon materials can be more satisfactorily suppressed. As a result, carbon nanofibers can be grown more satisfactorily. In addition, a decrease in the strength of the base material caused by significant oxygen deficiency in the base material can also be prevented.

In the production method, it is preferable that the oxygen ion-conductive oxide be a high temperature oxygen ion-conductive oxide capable of conducting oxygen ions at a high temperature of 500° C. or higher, and in the carbon nanofiber growing step, the structure for forming carbon nanofiber be heated to 500° C. or higher.

In this case, when the base material is heated to 500° C. or higher, it becomes easier for the base material to conduct oxygen ions, and therefore, oxygen ions can be sufficiently supplied to the metal catalyst.

Furthermore, the present invention is a method for producing a carbon nanofiber structure, the method including a preparation step of preparing the structure for forming carbon nanofiber; and a carbon nanofiber growing step of forming a carbon nanofiber structure having a carbon nanofiber aggregate layer on the metal catalyst of the structure for forming carbon nanofiber that is formed by supplying a raw material gas containing carbon to the metal catalyst by a CVD method, orienting plural strands of carbon nanofibers along a direction away from one surface of the base material, and thereby aggregating plural strands of carbon nanofibers, wherein bores that are formed on the metal catalyst side in the structure for forming carbon nanofiber and each have a bore diameter of 0.3 µm to 7 µm, are formed such that the total area of the bores is more than or equal to 1% and less than 40% relative to the area of the catalyst-supported surface on which the metal catalyst is provided.

According to this production method, when carbon nanofibers are grown by a CVD method in the carbon nanofiber growing step, a raw material gas containing carbon is supplied to the metal catalyst. At this time, the raw material gas diffuses into the metal catalyst, and carbon nanofibers are precipitated from the surface of the metal catalyst. While the activity of the metal catalyst is maintained, this diffusion and precipitation occur continuously, and carbon nanofibers grow. At this time, generally, as carbon nanotubes grow, carbon nanofibers that grow on the metal catalyst provided on one surface side of the base material inhibit diffusion of the gas, and make the gas supply to the metal catalyst difficult. As a result, there occurs a difference in the amount of supply of the raw material gas between the exposed sections that are exposed to the raw material gas and the coated sections that are coated by the carbon nanofibers. That is, non-uniformity occurs in terms of the amount of gas supply to the metal catalyst. Therefore, there is a difference in the rate of growth of the carbon nanofibers between the exposed sections and the coated sections. This becomes significant as the volume of the carbon nanofiber aggregate layer is increased.

From that point of view, in the production method of the present invention, bores having a bore diameter of 0.3 µm to 7 µm are formed on the metal catalyst side of the structure for forming carbon nanofiber such that the total area of the bores is more than or equal to 1% and less than 40% as the area ratio relative to the area of the catalyst-supported surface wherein the metal catalyst is provided. As a result, the following operation and effect are provided.

That is, first, carbon nanofibers grow toward a direction away from one surface of the base material on the metal catalyst. In other words, carbon nanofibers grow on regions excluding the regions in the one surface of the base material, where the metal catalyst is not formed, toward a direction away from the one surface of the base material. In this manner, a carbon nanofiber aggregate layer that is formed by aggregating plural carbon nanofibers that grow, is formed. At this time, holes each having a hole diameter of 0.3 µm to 7 µm are formed at the same area ratio as the area ratio of the bores formed on the metal catalyst side in the structure for forming carbon nanofiber, by being surrounded by plural carbon nanofibers. That is, in the carbon nanofiber aggregate layer, holes each having a hole diameter of 0.3 µm to 7 µm are formed such that the total area of the holes is more than or equal to 1% and less than 40% relative to the apparent area of the end surface on the opposite side of the base material in the carbon nanofiber aggregate layer. Furthermore, the raw material gas can pass through the holes and diffuse into the interior of the carbon nanofiber aggregate layer, and it becomes easier for the raw material gas to reach the metal catalyst. As a result, the difference in the amount of supply of the raw material gas between the exposed sections and the coated sections in the metal catalyst can be made small, and the difference in the rate of growth of the carbon nanofibers between the two areas can be made small.

When carbon nanofibers are grown in this manner, even if the carbon nanofibers grow long, the carbon nanofibers can be sufficiently prevented from bending. Furthermore, since the plural carbon nanofibers that grow are also sufficiently prevented from inhibiting the growth of one another, productivity of the carbon nanofibers can be sufficiently increased.

Furthermore, the carbon nanofiber structure obtainable according to the production method of the present invention is such that in the carbon nanofiber aggregate layer provided on one surface side of the base material, holes each having a hole diameter of 0.3 µm to 7 µm are appropriately formed by being surrounded by plural strands of carbon nanofibers. Therefore, for example, when an electrode of an electrochemical device including an electrolyte is formed from the relevant carbon nanofiber structure, the electrolyte can be easily and effectively transported to the interior of the carbon nanofiber aggregate layer through the holes. Therefore, the carbon nanofiber structure obtainable by the production method of the present invention can form a carbon nanofiber electrode capable of imparting excellent electrochemical performance to the electrochemical device.

Furthermore, the carbon nanofiber structure obtainable according to the production method of the present invention has, on one surface side of the base material, a carbon nanofiber aggregate layer formed by aggregating plural strands of carbon nanofibers, and in this carbon nanofiber aggregate layer, holes are formed by being surrounded by the plural strands of carbon nanofibers. That is, these holes do not compartmentalize the carbon nanofiber aggregate layer. Therefore, when a carbon yarn that is formed by continuously joining plural strands of carbon nanofibers is pulled out from the carbon nanofiber aggregate layer, a longer carbon yarn can be obtained.

In the method for producing a carbon nanofiber structure, in the preparation step, the bores in the structure for forming carbon nanofiber may be obtained by forming openings in the one surface of the base material, and forming the metal catalyst on the regions excluding the openings in the one surface of the base material.

Meanwhile, in the present invention, the "carbon nanofiber" refers to a hollow or solid fiber formed of carbon and having a fiber thickness of 50 nm or less. Here, the "fiber thickness" is intended to mean that in end surfaces of a carbon nanofiber, when a line that connects any two points on the outer circumference of the end surface on the opposite side of the base material is contemplated, a length of the line that makes the length of the line maximum is referred to as the fiber thickness.

Furthermore, in the present invention, regarding the "hole diameter" or "bore diameter", when a hole or a bore is observed by scanning electron microscopy (SEM), the area S in a two-dimensional image of the hole or bore is determined, the area S is considered to be equivalent to the area of a circle, and R is calculated from the area based on the following formula:

$$R=2\times(S/\pi)^{1/2}$$

The hole diameter or bore diameter is intended to mean the value of R.

Effect of the Invention

According to the present invention, there are provided a structure for forming carbon nanofiber capable of satisfactorily growing carbon nanofibers, a carbon nanofiber structure and a method for producing the structure, and a carbon nanofiber electrode.

MODE(S) FOR CARRYING OUT THE INVENTION

Hereinafter, embodiments of the present invention will be described in detail with reference to the drawings.

<First Embodiment>

Figure 1:
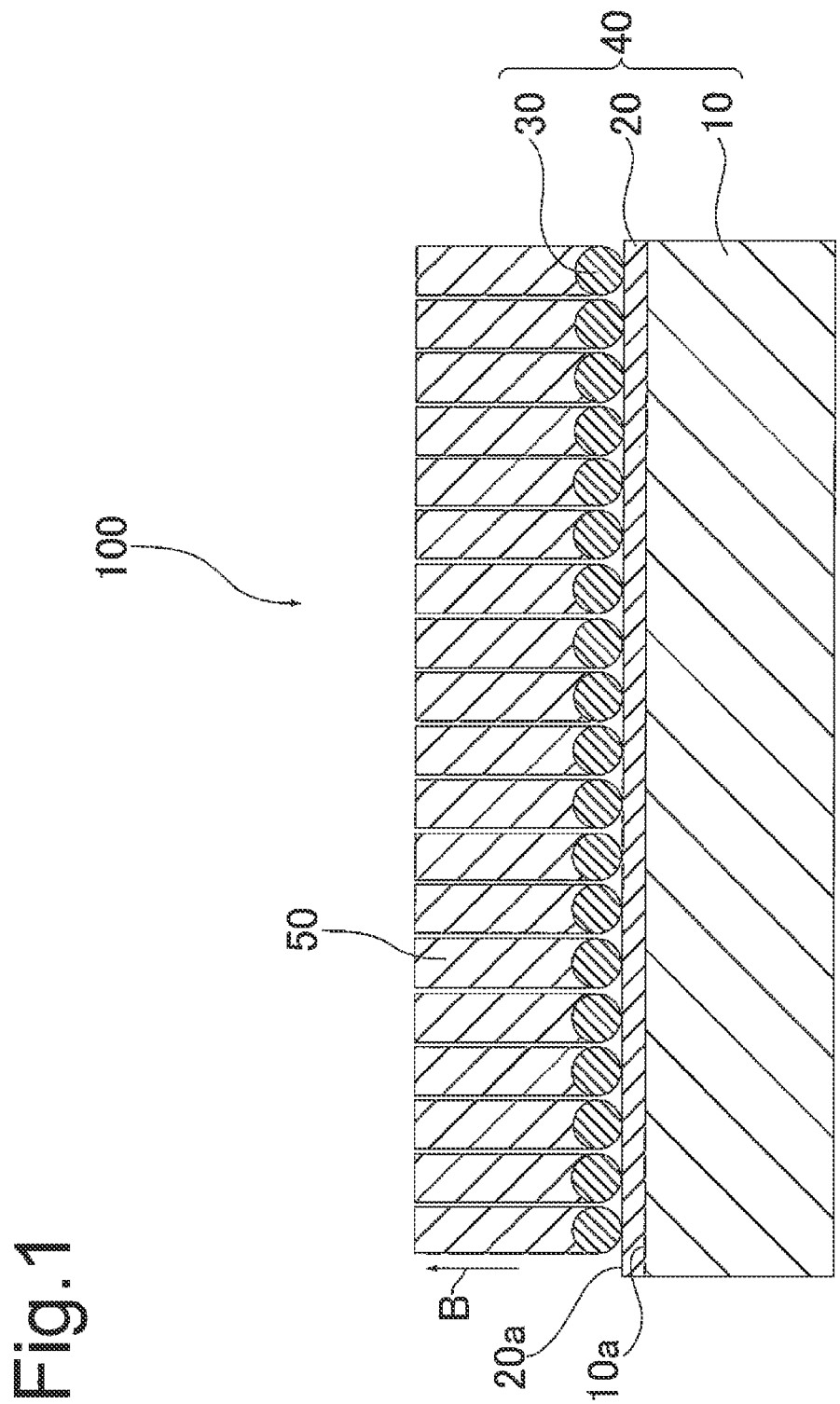
FIG. 1 is a cross-sectional view illustrating a first embodiment of the carbon nanofiber structure according to the present invention.
Figure 2:
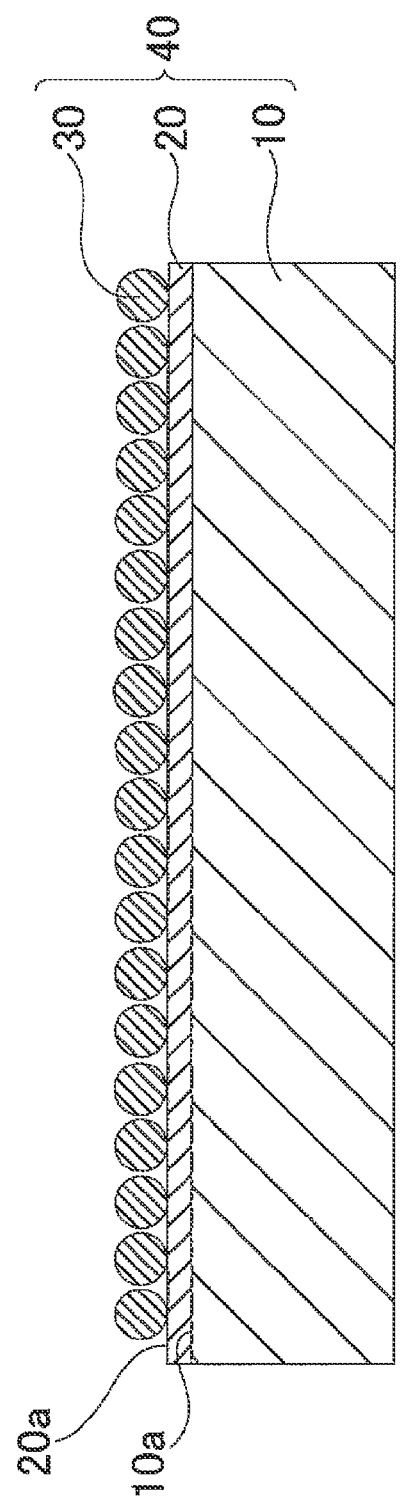
FIG. 2 is a cross-sectional view illustrating the structure for forming carbon nanofiber of FIG. 1.

First, a first embodiment of the carbon nanofiber structure of the present invention will be described with reference to FIG. 1 and FIG. 2. FIG. 1 is a cross-sectional view illustrating a first embodiment of the carbon nanofiber structure of the present invention, and FIG. 2 is a cross-sectional view illustrating the structure for forming carbon nanofiber of FIG. 1. As illustrated in FIG. 1, a carbon nanofiber structure 100 includes a structure for forming carbon nanofiber 40, and carbon nanofibers 50 that are provided on the structure for forming carbon nanofiber 40. As illustrated in FIG. 1 and FIG. 2, the structure for forming carbon nanofiber 40 includes a base material 10; a metal oxide layer 20 that is provided over the entire surface on one surface 10a of the base material 10 and is formed of a metal oxide; and a metal catalyst 30 that is supported on one surface 20a of the metal oxide layer 20 and acts as a catalyst when carbon nanofibers 50 are formed. The carbon nanofibers 50 are extended from the metal catalyst 30 toward an opposite direction B of the base material 10. The base material 10 includes an oxygen ion-conductive oxide.

<First Aspect of Production Method>

Next, a first aspect of the method for producing the carbon nanofiber structure 100 will be described.

The method for producing the carbon nanofiber structure 100 includes a carbon nanofiber growing step of growing the carbon nanofibers 50 by a CVD method on the metal catalyst 30 of the structure for forming carbon nanofiber 40, and thereby obtaining the carbon nanofiber structure 100. The carbon nanofiber growing step is carried out by supplying a raw material gas containing carbon. In the first aspect, a gas containing oxygen is not supplied to the metal catalyst 30 of the structure for forming carbon nanofiber 40.

In this case as well, a raw material gas containing carbon is used when the carbon nanofibers 50 are formed by a CVD method on the metal catalyst 30 of the structure for forming carbon nanofiber 40. At this time, the base material 10 is heated to an extent that oxygen ions can migrate. Therefore, oxygen ions in the base material 10 are conducted through the base material 10 and the metal oxide layer 20 and reach the metal catalyst 30. As a result, even if the carbon nanofibers 50 grow, oxygen can be supplied sufficiently to the metal catalyst 30, and deactivation of the metal catalyst 30 can be sufficiently suppressed. Furthermore, the oxygen ions in the base material 10 are conducted through the base material 10 and also reach the metal oxide layer 20. Therefore, even if cementation occurs in the metal oxide layer 20 due to the raw material gas containing carbon, or carbon materials are deposited on the surface of the metal oxide layer 20 due to the secondary reaction products of the raw material gas, oxygen ions that have reached the metal oxide layer 20 react with these carbons and form $CO_2$ and the like, and thereby cementation or deposition of carbon materials can be sufficiently suppressed. Therefore, a decrease in the catalyst supporting function of the metal oxide layer 20 can be sufficiently suppressed.

From the above, when the structure for forming carbon nanofiber 40 is used, carbon nanofibers 50 can be sufficiently grown.

Hereinafter, the method for producing the carbon nanofiber structure 100 described above will be explained in detail.

First, a structure for forming carbon nanofiber 40 is prepared. The structure for forming carbon nanofiber 40 is produced as follows.

(Base Material Preparation Step)

Figure 3:
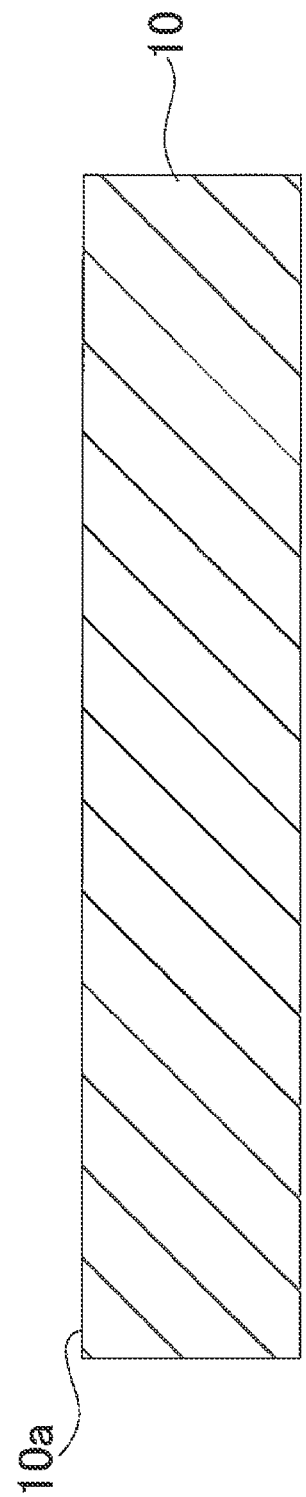
FIG. 3 is a cross-sectional view illustrating the base material for forming carbon nanofiber of FIG. 2.

First, a base material 10 is prepared (see FIG. 3).

As the base material 10, a material including an oxygen ion-conductive oxide is used. The oxygen ion-conductive oxide may be any oxide capable of conducting oxygen ions, but in a CVD method, the base material 10 is usually heated to a high temperature of 500° C. or higher. Therefore, the oxygen ion-conductive oxide is preferably a high temperature oxygen ion-conductive oxide capable of conducting oxygen ions at a high temperature of 500° C. or higher. As the high temperature oxygen ion-conductive oxide, for example, stabilized zirconium oxide formed by stabilizing zirconium oxide using an oxide can be used. Examples of the oxide that stabilizes the entirety or a portion of the high temperature oxygen ion-conductive oxide such as zirconium oxide, include scandia, yttria, lanthania, ceria, calcia and magnesia. These can be used singly or in combination of two or more kinds. These oxides are preferably incorporated in the high temperature oxygen ion-conductive oxide at a concentration in the range of 2 mol % to 13 mol %. Furthermore, as the high temperature oxygen ion-conductive oxide, a perovskite type oxide having oxygen defects can also be used. Examples of the perovskite type oxide include strontium titanate and calcium ferrate. These can be used singly or in combination of two or more kinds.

The thickness of the base material 10 is usually 100 μm to 10,000 μm, but is preferably 500 μm to 5,000 μm. In this case, the base material 10 has more sufficient strength, and it is easier to control the conduction of oxygen ions, as compared with the case in which the thickness is beyond the range of 500 μm to 5,000 μm.

(Metal Oxide Layer Forming Step)

Figure 4:
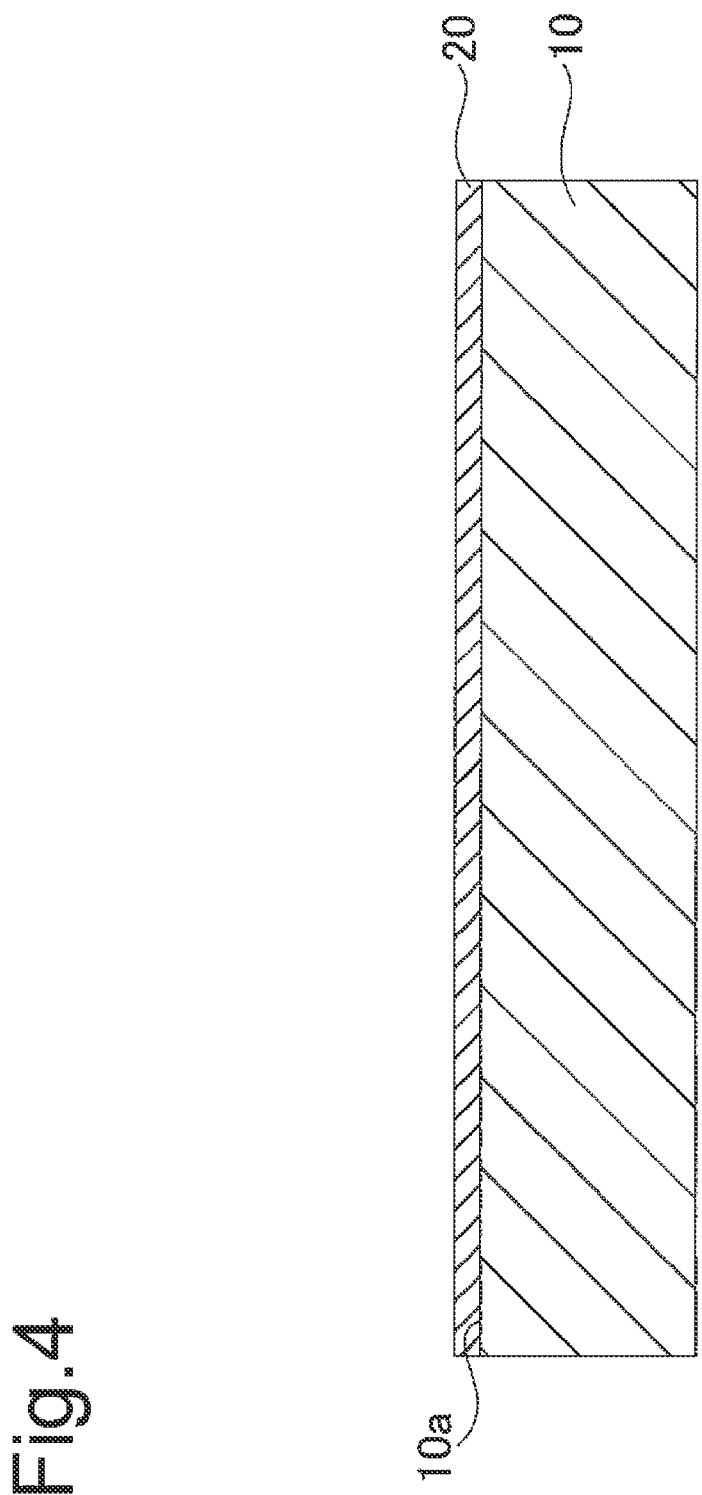
FIG. 4 is a diagram illustrating a process for producing the structure for forming carbon nanofiber of FIG. 2.

Next, a metal oxide layer 20 is formed on one surface 10*a* of the base material 10 (see FIG. 4). The metal oxide layer 20 is formed of a metal oxide. The metal oxide may be an oxide of any metal, but it is preferable that the metal oxide be an oxide of a Group II or Group III metal, from the viewpoint of thermodynamic stability in a reducing atmosphere. Among them, it is more preferable that the metal oxide be an oxide of a Group III metal, from the viewpoint of the catalyst supporting function. Examples of the oxide of the Group III metal include aluminum oxide, magnesium aluminate, and cerium oxide. These can be used singly or in combination of two or more kinds. Among these, aluminum oxide is most preferred. In this case, carbon nanofibers 50 can be grown more satisfactorily as compared with the case in which the metal oxide is a metal oxide other than aluminum oxide.

The thickness of the metal oxide layer 20 is usually 0.1 nm to 100 nm, but the thickness is preferably 0.5 nm to 10 nm. In this case, the carbon nanofibers 50 can be grown more effectively as compared with the case in which the thickness of the metal oxide layer 20 is not in this range.

The thickness of the metal oxide layer 20 is more preferably 1 nm to 8 nm. In this case, the carbon nanofibers 50 can be more effectively grown as compared with the case in which the thickness of the metal oxide layer 20 is not in the range of 1 nm to 8 nm.

The metal oxide layer 20 can be formed by, for example, a sputtering method. At this time, the target may be a metal element or may be a metal oxide, but it is necessary to supply oxygen gas at an appropriate concentration depending on the kind of the target. At this time, the temperature of the base material 10 is preferably set to 20° C. to 300° C., for the reason of improving the adhesiveness between the base material 10 and the metal oxide layer 20.

(Catalyst Supporting Step)

Next, a metal catalyst 30 is supported on one surface 20*a* of the metal oxide layer 20 (see FIG. 2). The metal catalyst 30 can be formed by, for example, heating, in a reducing atmosphere, the metal catalyst film formed on one surface 20*a* of the metal oxide layer 20 according to a sputtering method.

As the metal catalyst 30, any known metal catalyst that is used to grow carbon nanofibers 50 can be used. Examples of such a metal catalyst 30 include V, Mo, Fe, Co, Ni, Pd, Pt, Rh, Ru, W, Al, Au and Ti. These can be used singly or in combination of two or more kinds. Among them, since the carbon nanofibers 50 can be more effectively grown, V, Mo, Fe, Co, Ni, Pd, Pt, Rh, Ru, W or a combination of two or more kinds thereof is preferred.

The shape of the metal catalyst 30 is not particularly limited, but the shape is usually particulate. The average particle size of the particulate metal catalyst 30 is usually 1 nm to 50 nm, but the average particle size is preferably 2 nm to 25 nm. In this case, the carbon nanofibers 50 can be more effectively grown as compared with the case in which the average particle size of the metal catalyst 30 is not in the range of 2 nm to 25 nm.

In this manner, the structure for forming carbon nanofiber 40 is obtained.

(Carbon Nanofiber Growing Step)

Next, carbon nanofibers 50 are grown by a CVD method on the metal catalyst 30 of the structure for forming carbon nanofiber 40 using a raw material gas containing carbon.

Here, the raw material gas containing carbon may be any gas capable of growing the carbon nanofibers 50 in the presence of an appropriate catalyst. Examples of such a raw material gas include saturated hydrocarbon compounds such as methane, ethane and propane; unsaturated hydrocarbon compounds such as ethylene, propylene and acetylene; and aromatic hydrocarbon compounds such as benzene and toluene. Among these, methane, ethylene, propylene and acetylene are preferred. The raw material gas (carbon-containing compound) may be introduced in a gas form, may be introduced as a mixture with an inert gas such as argon, may be introduced as a mixture with hydrogen gas, or may be introduced as saturated vapor in an inert gas.

Furthermore, in the CVD method, heat, plasma or the like is used as an energy source.

At this time, the pressure of the atmosphere at the time of growing the carbon nanofibers 50 is usually 100 Pa to 150,000 Pa, and preferably 1,000 Pa to 122,000 Pa. Furthermore, the temperature of the atmosphere at the time of growing the carbon nanofibers 50 is usually 500° C. to 900° C., and preferably 550° C. to 800° C.

Figure 5:
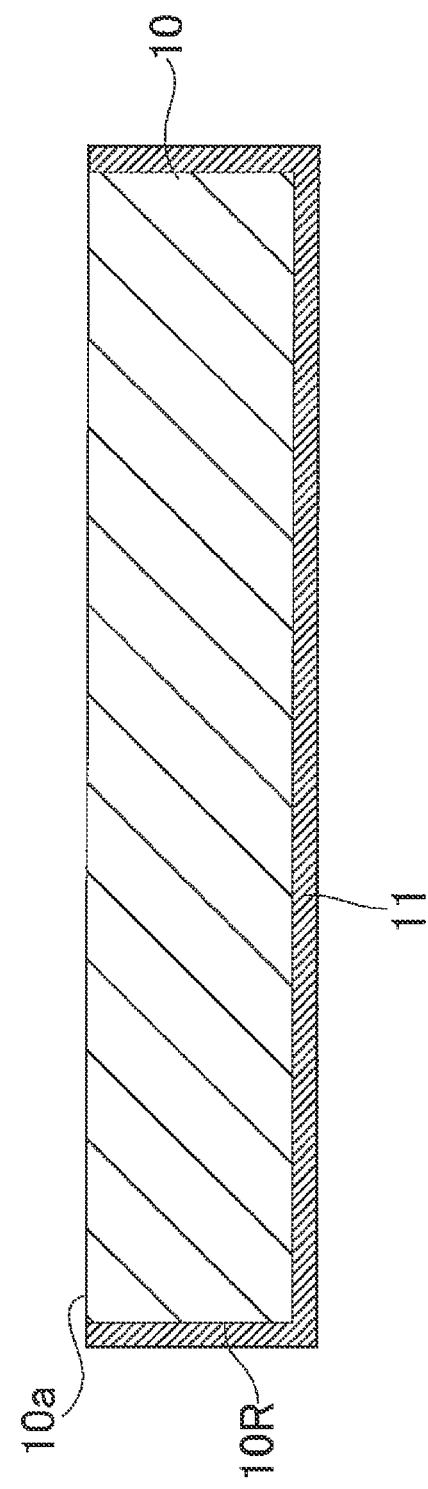
FIG. 5 is a cross-sectional view illustrating an example of the state in which a portion of the base material of FIG. 3 is covered with a coating.

Furthermore, as described previously, in the production method of the first aspect, oxygen ions in the base material 10 are supplied to the metal oxide layer 20 and the metal catalyst 30. Therefore, in the production method of the first aspect, as shown in FIG. 5, it is preferable that surfaces 10R in the base material 10 excluding the one surface 10*a* where the metal oxide layer 20 is provided, be provided with a coating 11 that covers these surfaces. This is because the oxygen ions that have reached the surface in the base material 10 becoming oxygen gas and being released from the base material 10, is more sufficiently suppressed by the coating 11, and the release surface of oxygen ions is limited to the one surface 10a so that oxygen ions are effectively supplied to the metal oxide layer 20 and the metal catalyst 30. Therefore, the carbon nanofibers 50 can be grown more effectively as compared with the case in which the coating 11 is not provided on the surfaces 10R in the base material 10 excluding the one surface 10a on which the metal oxide layer 20 is provided. Furthermore, since oxygen gas is not released from the base material 10, the product quality of the carbon nanofibers 50 being adversely affected is also sufficiently suppressed. Furthermore, when the carbon nanofibers 50 are grown over a long time, the strength of the edges of the base material 10 being decreased due to oxygen deficiency caused by the release of excessive oxygen gas, can be prevented. Accordingly, the growth of the carbon nanofibers 50 over a long time can be carried out stably.

The coating material that constitutes the coating 11 may be any material that substantially does not conduct oxygen ions, and examples of such a coating material include glass, titanium dioxide, and metals.

In this manner, the carbon nanofiber structure 100 is obtained.

Figure 6:
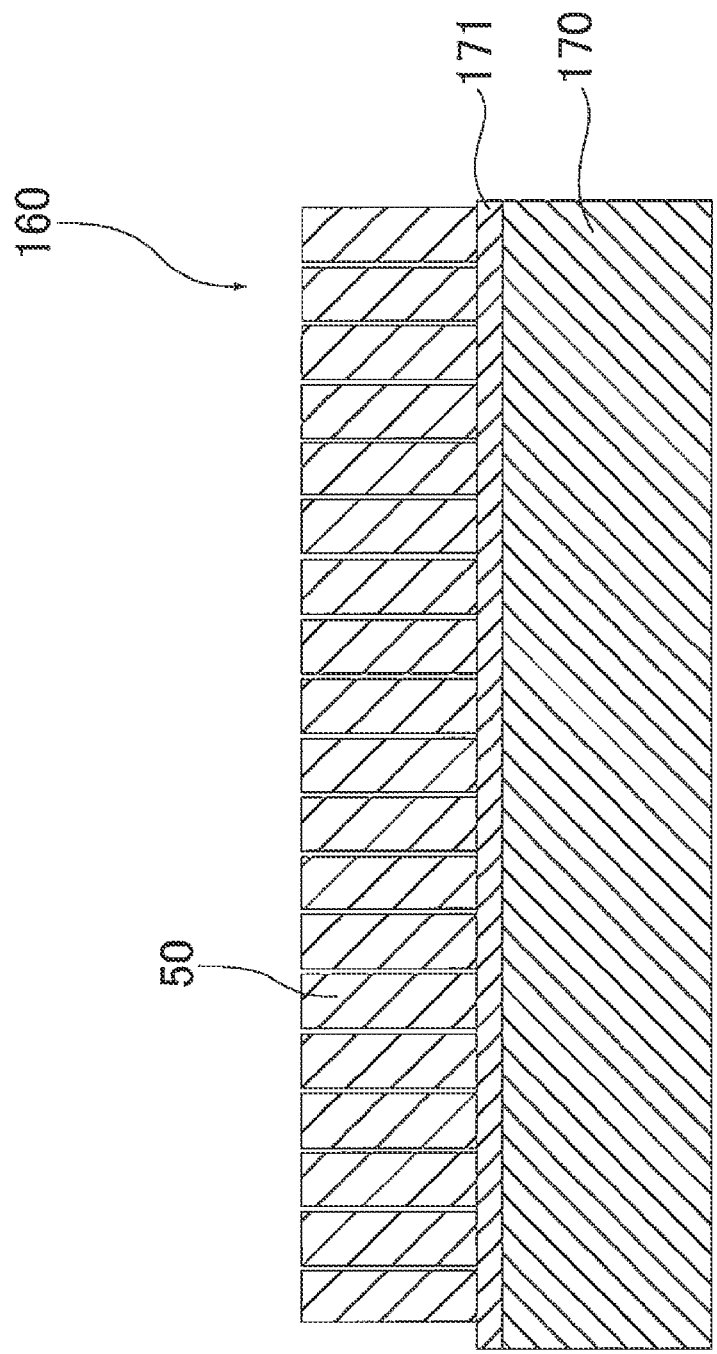
FIG. 6 is a cross-sectional view illustrating an embodiment of a carbon nanofiber electrode according to the present invention.

The carbon nanofiber structure 100 obtainable in this manner has sufficiently grown carbon nanofibers 50. Therefore, a carbon nanofiber electrode formed using the carbon nanofiber structure 100 is useful as an electrode for dye-sensitized solar cells, lithium ion secondary batteries, lithium ion capacitors, electric double layer capacitors, fuel cells, and the like. Furthermore, as illustrated in FIG. 6, the carbon nanofiber electrode 160 can be usually obtained by transferring the carbon nanofibers 50 of the carbon nanofiber structure 100 to a substrate 170 for electrodes. Transfer of the carbon nanofibers 50 to the substrate 170 for electrodes may be carried out by, for example, disposing a conductive adhesive film 171 between the substrate 170 for electrodes and the carbon nanofibers 50 of the carbon nanofiber structure 100 and pressing the assembly. The substrate 170 for electrodes may vary depending on the use of the electrode. When the carbon nanofiber electrode is used in a dye-sensitized solar cell, the substrate 170 for electrodes is composed of, for example, a corrosion resistant metal material such as titanium, nickel, platinum, molybdenum or tungsten; or a glass substrate having a conductive oxide such as ITO or FTO formed thereon.

<Second Aspect of Production Method>

Next, a second aspect of the method for producing carbon nanofiber structure 100 will be explained.

The production method of the second aspect is different from the production method of the first aspect from the viewpoint that when the carbon nanofibers 50 are grown, a gas containing oxygen is supplied through the side of the one surface 10a on which the metal oxide layer 20 is provided in the base material 10.

Also in this case, similarly to the first aspect, when carbon nanofibers 50 are formed by a CVD method on the metal catalyst 30 of the structure for forming carbon nanofibers 40, a raw material gas containing carbon is used. At this time, since the base material 10 is heated to an extent that oxygen ions can migrate, oxygen ions in the base material 10 are conducted through the base material 10 and the metal oxide layer 20 and reach the metal catalyst 30. As a result, even if the carbon nanofibers 50 grow, oxygen can be sufficiently supplied to the metal catalyst 30, and deactivation of the metal catalyst 30 can be sufficiently suppressed. Furthermore, the oxygen ions in the base material 10 are conducted through the base material 10 and reach the metal oxide layer 20. Therefore, even if cementation occurs in the metal oxide layer 20 due to the raw material gas containing carbon, or carbon materials are deposited on the surface of the metal oxide layer 20 due to secondary reaction products of the raw material gas, the oxygen ions that have reached the metal oxide layer 20 react with these carbons and form $CO_2$ and the like, and thereby cementation or deposition of carbon materials can be suppressed. Furthermore, cementation or deposition of carbon materials can be suppressed more effectively by supplying a gas containing oxygen through the side of the one surface 10 on which the metal oxide layer 20 is provided in the base material 10.

Here, the oxygen-containing gas containing oxygen may be any gas as long as it can supply oxygen to the metal oxide layer 20 and the metal catalyst 30 at an appropriate temperature, and examples of such an oxygen-containing gas include oxygen molecule-containing gases such as pure oxygen gas and air. Alternatively, water, carbon monoxide, or a non-oxygen molecule-containing gas formed of an oxygen-containing hydrocarbon compound such as methanol, ethanol or acetone can also be used as the oxygen-containing gas. Among these, the oxygen-containing hydrocarbon compound can also function as the raw material gas.

The oxygen-containing gas may be supplied alone, may be supplied as a mixture with an inert gas such as argon, or may be supplied as saturated vapor in an inert gas. Meanwhile, the oxygen concentration in the atmosphere to which an oxygen-containing gas has been supplied when the carbon nanofibers 50 are formed is preferably 0.003% to 0.03% by volume in terms of the oxygen molecule concentration. When the oxygen molecule concentration is in the above range, the carbon nanofibers 50 can be grown more effectively as compared with the case in which the oxygen molecule concentration is not in the aforementioned range.

Meanwhile, in the present aspect as well, oxygen ions in the base material 10 are supplied to the metal oxide layer 20 and the metal catalyst 30. Therefore, it is preferable that the surfaces 10R in the base material 10 excluding the one surface 10a on which the metal oxide layer 20 and the metal catalyst 30 are provided, be provided with a coating 11 that covers these surfaces. This is because oxygen ions that have reached the surface in the base material 10 becoming oxygen gas and being released from the base material 10, is suppressed more satisfactorily by the coating 11, the release surface of oxygen ions is limited to the one surface 10a, and thereby oxygen ions are effectively supplied to the metal oxide layer 20 and the metal catalyst 30. Therefore, carbon nanofibers 50 can be more effectively grown as compared with the case in which the coating 11 is not provided on the surfaces 10R in the base material 10 excluding the one surface 10a on which the metal oxide layer 20 and the metal catalyst 30 are provided. Furthermore, as oxygen gas is released in excess from the base material 10, the oxygen concentration deviating from the conditions that are optimal for the growth of the carbon nanofibers 50 and adversely affecting the growth, is also sufficiently suppressed. Furthermore, when the carbon nanofibers 50 are grown over a long time, the strength of the edges of the base material 10 being decreased due to oxygen deficiency caused by excessive release of oxygen gas, can be prevented. Therefore, the growth of the carbon nanofibers 50 over a long time can be carried out stably.

<Third Aspect of Production Method>

Next, a third aspect of the method for producing the carbon nanofiber structure 100 will be described.

The production method of the third aspect is different from the production method of the first aspect in that when carbon nanofibers 50 are grown, an oxygen molecule-containing gas containing oxygen molecules is supplied through the side of a surface 10b on the opposite side of the metal oxide layer 20 in the base material 10.

When an oxygen molecule-containing gas is appropriately supplied through the surface 10b on the opposite side of the metal oxide layer 20, the oxygen molecules included in the oxygen molecule-containing gas are more effectively supplied as oxygen ions to the metal oxide layer 20 through the base material 10. Therefore, the amount of oxygen ions supplied to the metal oxide layer 20 can be controlled, a decrease in the catalyst supporting function of the metal oxide layer 20 can be further suppressed, and the carbon nanofibers 50 can be grown more satisfactorily. Furthermore, since oxygen deficiency in the base material 10 is sufficiently suppressed, a decrease in the base material strength caused by significant oxygen deficiency in the base material 10 can also be prevented.

Figure 7:
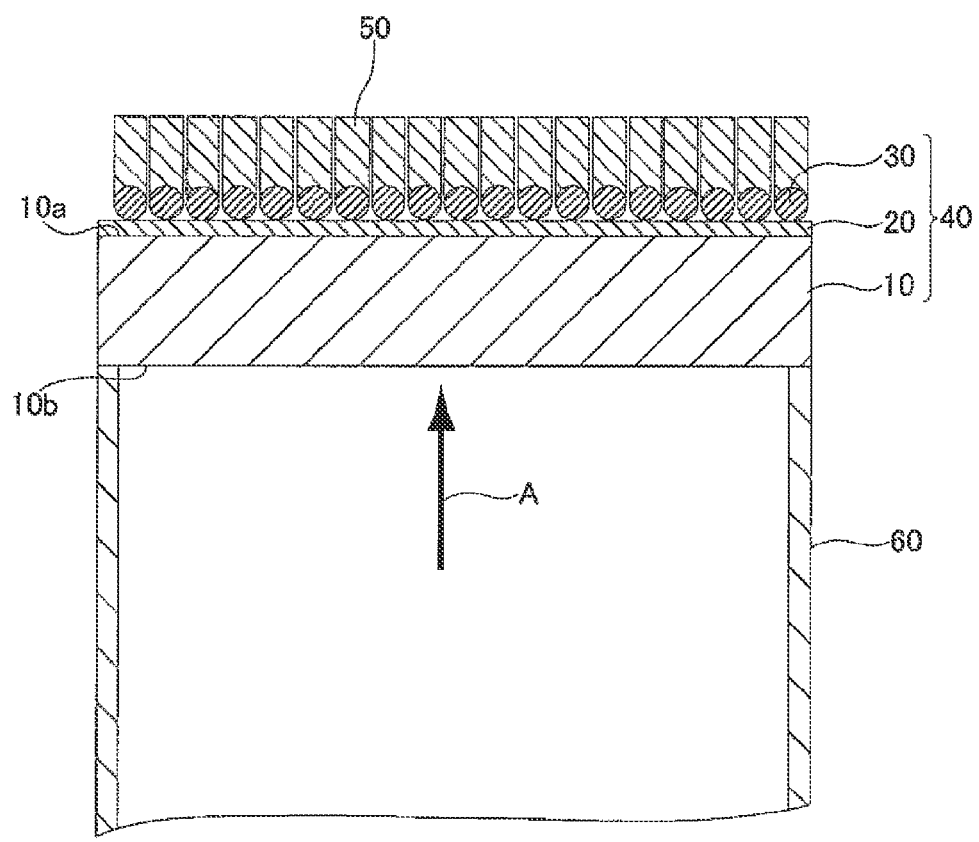
FIG. 7 is a diagram illustrating another process for producing the structure for forming carbon nanofiber of FIG. 2.

Particularly, in the third aspect, as illustrated in FIG. 7, it is preferable that an oxygen molecule-containing gas be supplied toward the surface 10b of the base material 10, that is, toward the direction of arrow A in FIG. 7, while the opening on one end side of a cylindrical body 60 is blocked with the surface 10b of the base material 10 of the structure for forming carbon nanofiber 40. At this time, the oxygen molecule-containing gas is made not to leak through the joint between the cylindrical body 60 and the structure for forming carbon nanofiber 40. In this case, the raw material gas supplied to the base material 10 being incorporated into the interior of the cylindrical body 60, reacting with an oxygen molecule-containing gas and changing the oxygen molecule concentration, is sufficiently suppressed, and thereby, the oxygen molecule-containing gas supplied to the interior of the cylindrical body 60 can be stably supplied toward the surface 10b of the base material 10. Furthermore, an oxygen molecule-containing gas is used on the side of the surface 10b in the base material 10, and an oxygen-containing gas is not used on the side of the one surface 10a in the base material 10. Therefore, the carbon nanofibers 50 on the side of the one surface 10a in the base material 10 being oxidized by the oxygen-containing gas is sufficiently suppressed, and a decrease in conductivity or a decrease in strength of the carbon nanofibers 50 can be sufficiently suppressed. That is, a decrease in the quality of the carbon nanofibers 50 can be more satisfactorily suppressed.

Figure 8:
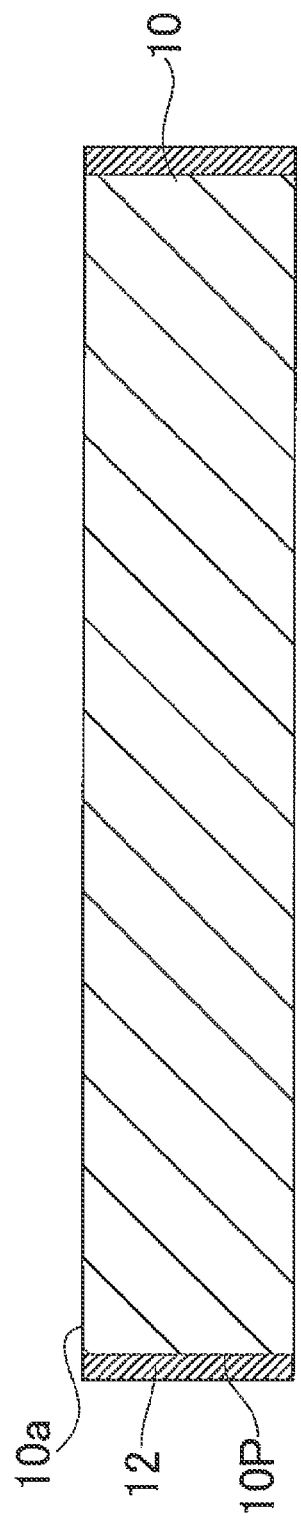
FIG. 8 is a cross-sectional view illustrating another example of the state in which a portion of the base material of FIG. 3 is covered with a coating.

Furthermore, also in the production method of the third aspect, oxygen ions in the base material 10 are supplied to the metal oxide layer 20 and the metal catalyst 30. Therefore, as illustrated in FIG. 8, it is preferable that in the base material 10, surfaces 102 excluding the one surface 10a on which the metal oxide layer 20 and the metal catalyst 30 are provided, and the surface 10b to which oxygen molecule-containing gas is supplied, be provided with a coating 12.

In this case, the oxygen ions that have reached the surface in the base material 10 becoming oxygen gas and being released from the base material 10, is sufficiently suppressed by the coating 12, the release surface of oxygen ions is limited to the one surface 10a, and oxygen ions are effectively supplied to the metal oxide layer 20. Therefore, as compared with the case in which the coating 12 is not provided on the surfaces excluding the one surface 10a on which the metal oxide layer 20 is provided and the surface 10b to which an oxygen molecule-containing gas is supplied, the carbon nanofibers 50 can be more effectively grown. Furthermore, since oxygen gas is not released from the base material 10, the product quality of the carbon nanofibers 50 being adversely affected is also sufficiently suppressed. As the coating material that constitutes the coating 12, the same material as the coating material that constitutes the coating 11 described in the first aspect can be used.

Meanwhile, the oxygen molecule concentration in the oxygen molecule-containing gas is preferably 0.01% to 5% by volume, and more preferably 0.1% to 2.5% by volume. When the oxygen molecule concentration is in the range of 0.01% to 5% by volume, the carbon nanofibers 50 can be grown more effectively as compared with the case in which the oxygen molecule concentration is not in the range.

<Fourth Aspect of Production Method>

Next, a fourth aspect of the method for producing the carbon nanofiber structure 100 will be described.

The production method of the fourth aspect is different from the production method of the second aspect in that an oxygen molecule-containing gas containing oxygen molecules is supplied through the side of the surface 10b on the opposite side of the metal oxide layer 20 and the metal catalyst 30 in the base material 10.

When an oxygen molecule-containing gas is appropriately supplied through the surface 10b on the opposite side of the metal oxide layer 20 and the metal catalyst 30 in the base material 10, oxygen molecules contained in the oxygen molecule-containing gas are more effectively supplied as oxygen ions to the metal oxide layer 20 and the metal catalyst 30 through the base material 10. Therefore, the amount of oxygen ions supplied to the metal oxide layer 20 can be controlled, a decrease in the catalyst supporting function of the metal oxide layer 20 can be further suppressed, and the carbon nanofibers 50 can be grown more satisfactorily. In addition, a decrease in the strength of the base material 10 caused by significant oxygen deficiency in the base material 10 can also be prevented. Furthermore, when a gas containing oxygen is supplied through the side of the one surface 10a on which the metal oxide layer 20 and the metal catalyst 30 are provided in the base material 10, cementation or deposition of carbon materials in the metal oxide layer 20 can be more effectively suppressed, and the carbon nanofibers 50 can be grown more satisfactorily.

Particularly, in the fourth aspect, similarly to the third aspect, as illustrated in FIG. 7, it is preferable to supply the oxygen molecule-containing gas toward the surface 10b of the base material 10 while the opening on one end side of a cylindrical body 60 is blocked with the surface 10b of the base material 10 of the structure for forming carbon nanofiber 40. At this time, the oxygen molecule-containing gas is prevented from leaking through the joint between the cylindrical body 60 and the structure for forming carbon nanofiber 40. In this case, it is sufficiently suppressed that the raw material gas supplied to the base material 10 reacts with the oxygen molecule-containing gas as a result of leaking into the interior of the cylindrical body 60 and the oxygen molecule concentration changes, and the oxygen molecule-containing gas supplied into the interior of the cylindrical body 60 can be supplied stably toward the surface 10b of the base material 10. Furthermore, an oxygen molecule-containing gas is used on the side of the surface 10b in the base material 10, and an oxygen-containing gas is used on the side of the one surface 10a in the base material 10. Therefore, as the oxygen gas included in the oxygen molecule-containing gas is released in excess through the joint, the oxygen concentration deviating from the conditions that are optimal for the growth of the carbon nanofibers 50 on the side of the one surface 10a in the base material 10 and adversely affecting the growth, is also sufficiently suppressed.

Furthermore, in the production method of the fourth aspect as well, oxygen ions in the base material 10 are supplied to the metal oxide layer 20 and the metal catalyst 30. Therefore, for the same reasons as the reasons described in the third aspect, it is preferable that a coating 12 be provided on the surfaces 10P excluding the one surface 10a on which the metal oxide layer 20 and the metal catalyst 30 are provided, and the surface 10b to which an oxygen molecule-containing gas is supplied.

Meanwhile, the oxygen molecule concentration in the oxygen molecule-containing gas on the side of the surface 10b is preferably 0.01% to 5% by volume, and more preferably 0.1% to 2.5% by volume. When the oxygen molecule concentration is in the range of 0.01% to 5% by volume, the carbon nanofibers 50 can be grown more effectively as compared with the case in which the oxygen molecule concentration is not in the range. Furthermore, the oxygen concentration of the oxygen-containing gas on the side of the one surface 10a is preferably 0.003% to 0.03% by volume, and more preferably 0.01% to 0.02% by volume, in terms of the oxygen molecule concentration. When the oxygen concentration is in the range of 0.003% to 0.03% by volume, the carbon nanofibers 50 can be grown more effectively as compared with the case in which the oxygen concentration is not in the range.

<Second Embodiment>

Figure 9:
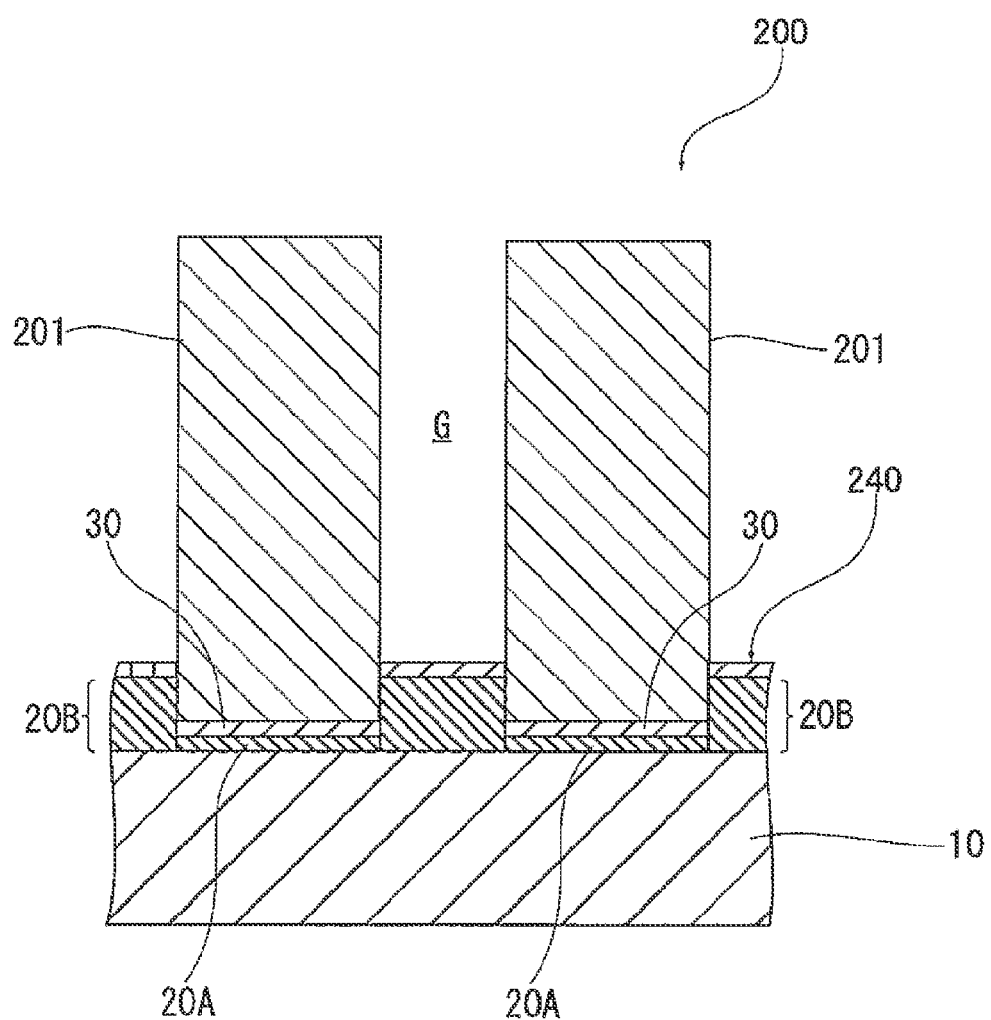
FIG. 9 is a partial cross-sectional view illustrating a second embodiment of the carbon nanofiber structure according to the present invention.

Next, a second embodiment of the carbon nanofiber structure of the present invention will be described with reference to FIG. 9. FIG. 9 is a partial cross-sectional view illustrating the second embodiment of the carbon nanofiber structure of the present invention.

As illustrated in FIG. 9, the carbon nanofiber structure 200 of the present embodiment is different from the carbon nanofiber structure 100 of the first embodiment from the viewpoint of having, as a structure for forming carbon nanofiber, a structure for forming carbon nanofiber 240 in which a portion of the metal oxide layer 20 is composed of plural thinner sections 20A each of which have a thickness of 0.5 nm to 10 nm and that are provided so as to be separated from each other, and the remaining portion is composed of thicker sections 20B each having a thickness larger than 10 nm.

In this case, in the thinner sections 20A, a carbon nanofiber aggregate layer 201 can be grown more satisfactorily than in the thicker sections 20B. Therefore, the carbon nanofiber aggregate layer 201 can be made to protrude more on the metal catalyst 30 provided on each of the plural thinner sections 20A, than on the metal catalyst 30 provided on the thicker sections 20B. In this case, since gaps G are formed in between the carbon nanofiber aggregate layers 201 grown on the metal catalyst 30 provided on each of the plural thinner sections 20A, when a raw material gas is supplied for the growth of the carbon nanofiber aggregate layer 201, the raw material gas can penetrate into the gaps G. Accordingly, as compared with the case in which the plural thinner sections 20A gather together into one (case in which the plural thinner sections 20A are not separated apart), the raw material gas can be supplied more sufficiently on the metal catalyst 30 provided on each of the plural thinner sections 20A. As a result, the unevenness of length of the carbon nanofibers that constitute the carbon nanofiber aggregate layer 201, in the respective sections of the plural thinner sections can be made sufficiently small. Furthermore, there is a tendency that when one strand of the carbon nanofibers that constitute the carbon nanofiber aggregate layer 201 is pulled out from each of the plural thinner sections 20A, other carbon nanofibers are pulled out in the form of being connected in series to the foregoing carbon nanofiber. Therefore, one strand of high strength fiber can be easily formed by intertwining the carbon nanofibers pulled out from the respective sections of the plural thinner sections 20A.

<Third Embodiment>

Figure 10:
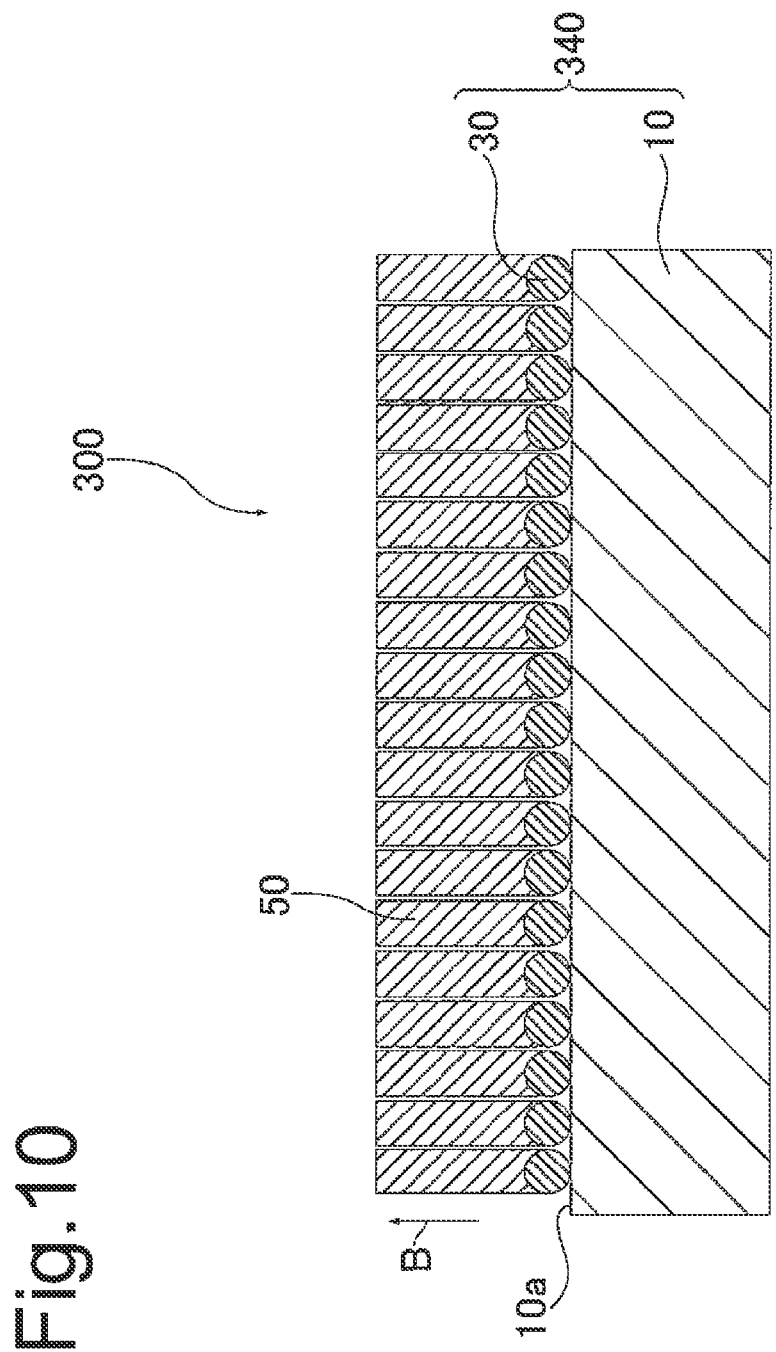
FIG. 10 is a cross-sectional view illustrating the third embodiment of the carbon nanofiber structure according to the present invention.
Figure 11:
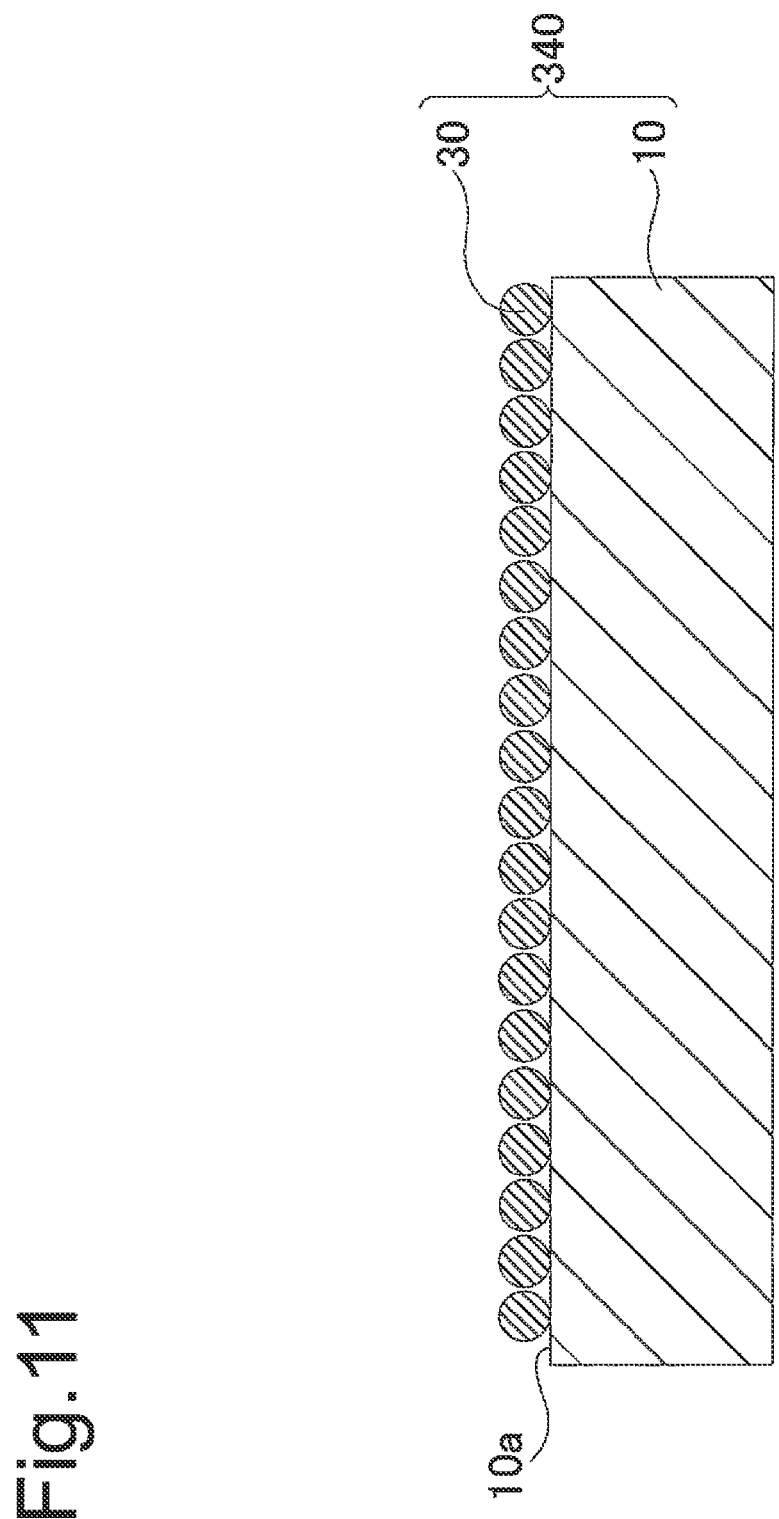
FIG. 11 is a cross-sectional view illustrating the structure for forming carbon nanofiber of FIG. 10.

Next, a third embodiment of the carbon nanofiber structure of the present invention will be described with reference to FIG. 10 and FIG. 11. FIG. 10 is a cross-sectional view illustrating the third embodiment of the carbon nanofiber structure of the present invention, and FIG. 11 is a cross-sectional view illustrating the structure for forming carbon nanofiber of FIG. 10. As illustrated in FIG. 10, the carbon nanofiber structure 300 of the present embodiment includes a structure for forming carbon nanofiber 340, and carbon nanofibers 50 that are provided on the structure for forming carbon nanofiber 340. As illustrated in FIG. 11, the structure for forming carbon nanofiber 340 includes a base material 10, and a metal catalyst 30 that is supported on one surface 10a of the base material 10 and acts as a catalyst when the carbon nanofibers 50 are formed. The carbon nanofibers 50 are extended from the metal catalyst 30 toward the opposite direction B of the base material 10. The base material 10 includes an oxygen ion-conductive oxide.

That is, the structure for forming carbon nanofiber 340 in the carbon nanofiber structure 300 of the present embodiment is different from the structure for forming carbon nanofiber 40 of the first embodiment in that the metal catalyst 30 is provided directly on one surface 10a of the base material 10. In other words, the structure for forming carbon nanofiber 340 in the carbon nanofiber structure 300 of the present embodiment is different from the structure for forming carbon nanofiber 40 of the first embodiment in that the structure does not have a metal oxide layer 20 between the metal catalyst 30 and the one surface 10a of the base material 10.

<First Aspect of Production Method>

Next, a first aspect of the method for producing the carbon nanofiber structure 300 will be described.

The method for producing the carbon nanofiber structure 300 includes a carbon nanofiber growing step of growing carbon nanofibers 50 by a CVD method on the metal catalyst 30 of the structure for forming carbon nanofiber 340, and thereby obtaining the carbon nanofiber structure 300. The carbon nanofiber growing step is carried out by supplying a raw material gas containing carbon. In the present aspect, a gas containing oxygen is not supplied to the metal catalyst 30 of the structure for forming carbon nanofiber 340.

In this case as well, when the carbon nanofibers 50 are formed by a CVD method on the metal catalyst 30 of the structure for forming carbon nanofiber 340, a raw material gas containing carbon is used. At this time, since the base material 10 is heated to a temperature to an extent that oxygen ions can migrate, oxygen ions in the base material 10 are conducted through the base material 10 and reach the metal catalyst 30. As a result, even if the carbon nanofibers 50 grow, oxygen can be supplied sufficiently to the metal catalyst 30, and deactivation of the metal catalyst 30 can be sufficiently suppressed. Therefore, the carbon nanofibers 50 can be sufficiently grown.

Hereinafter, the method for producing the carbon nanofiber structure 300 will be described in detail.

First, a structure for forming carbon nanofibers 340 is prepared. The structure for forming carbon nanofiber 340 is produced as follows.

(Base Material Preparing Step)

First, a base material 10 is prepared (see FIG. 3).

(Catalyst Supporting Step)

Next, a metal catalyst 30 is supported on one surface 10a of the base material 10 (see FIG. 2). The metal catalyst 30 can be formed by, for example, heating a film formed on the one surface 10a of the base material according to a sputtering method, in a reducing atmosphere.

In this manner, the structure for forming carbon nanofiber 340 is obtained.

<Carbon Nanofiber Growing Step>

Next, in the same manner as in the first to fourth aspects of the method for producing the carbon nanofiber structure 100, carbon nanofibers 50 are grown on the metal catalyst 30 of the structure for forming carbon nanofiber 340 by a CVD method using a raw material gas containing carbon.

<Fourth Embodiment>

Figure 12:
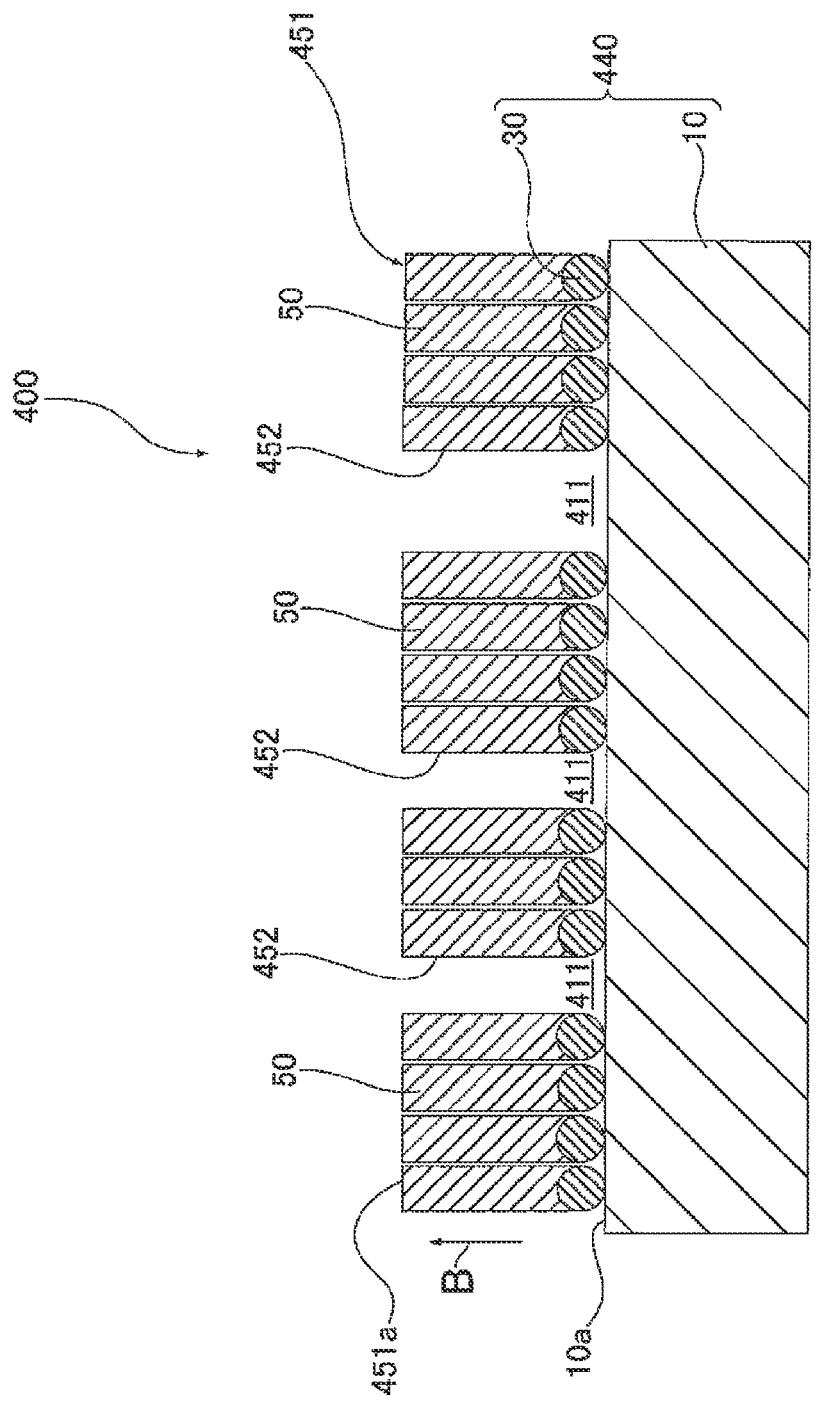
FIG. 12 is an end view of a cut surface illustrating a fourth embodiment of the carbon nanofiber structure according to the present invention.
Figure 13:
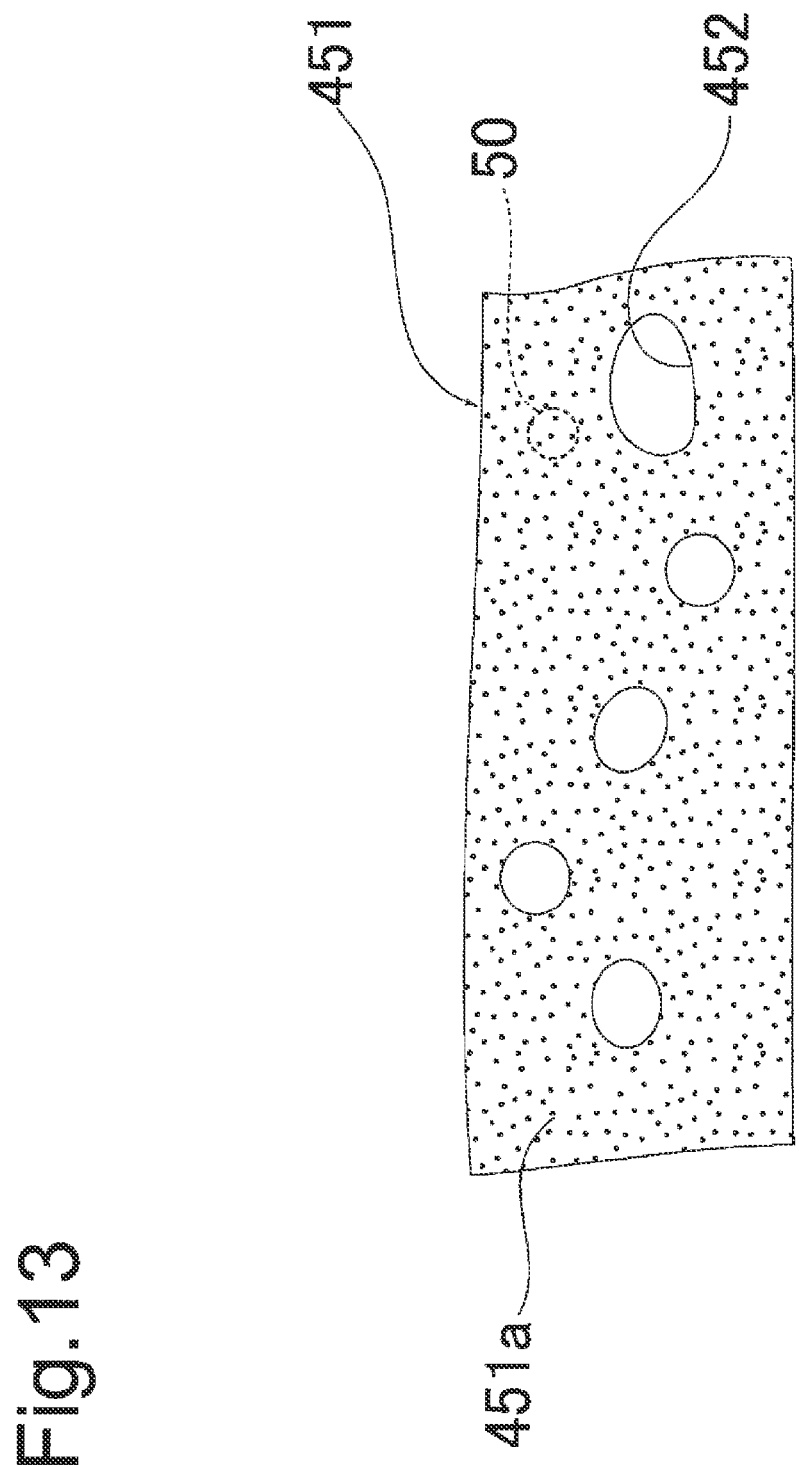
FIG. 13 is a partial plan view illustrating the carbon nanofiber structure of FIG. 12.

Next, a fourth embodiment of the carbon nanofiber structure of the present invention will be described with reference to FIG. 12 and FIG. 13. FIG. 12 is an end view of a cut surface illustrating the fourth embodiment of the carbon nanofiber structure of the present invention, and FIG. 13 is a partial plan view illustrating the carbon nanofiber structure of FIG. 12. As illustrated in FIG. 12, a carbon nanofiber structure 400 includes a structure for forming carbon nanofiber 440, and a carbon nanofiber aggregate layer 451 provided on the structure for forming carbon nanofiber 440. The carbon nanofiber aggregate layer 451 is formed by aggregating plural strands of carbon nanofibers 50.

The structure for forming carbon nanofiber 440 includes a base material 10, and particulate metal catalysts 30 that are supported on one surface 10a of the base material 10 and act as a catalyst when the carbon nanofibers 50 are formed. Furthermore, the structure for forming carbon nanofiber 440 has bores 411 that are formed between the particulate metal catalysts 30.

In the carbon nanofiber aggregate layer 451, the carbon nanofibers 50 are oriented from the metal catalysts 30 along a direction B away from the base material 10. The carbon nanofibers 50 may be single-layer carbon nanofibers, or may be multilayer carbon nanofibers.

The carbon nanofiber aggregate layer 451 has holes 452, as shown in FIG. 13, and the holes 452 are formed by being surrounded by plural strands of carbon nanofibers 50. In the carbon nanofiber aggregate layer 451, the holes 452 form through-holes and are in communication with the bores 411 that are formed in between the particle metal catalysts 30. The holes 452 each have a hole diameter of 0.3 µm to 7 µm, and in the carbon nanofiber aggregate layer 451, the total area of the holes 452 is more than or equal to 1% and less than 40% relative to the apparent area of the end surface 451a on the opposite side of the base material 10 (hereinafter, referred to as "upper end surface") in the carbon nanofiber aggregate layer 451. Here, the total area of the holes 452 is calculated by observing the holes 452 of the carbon nanofiber aggregate layer 451 from a direction perpendicular to the one surface 10a of the base material 10. Furthermore, the apparent area of the upper end surface 451a is calculated by observing the upper end surface 451a of the carbon nanofiber aggregate layer 451 from a direction perpendicular to the one surface 10a of the base material 10. Meanwhile, the apparent area is intended to mean an area including not only the holes 452 but also the portions other than the holes 452.

According to this carbon nanofiber structure 400, in the carbon nanofiber aggregate layer 451 that is provided on the side of the one surface 10a of the base material 10, holes 452 each having a hole diameter of 0.3 µm to 7 µm are appropriately formed by being surrounded by plural strands of the carbon nanofibers 50. Therefore, for example, when an electrode of an electrochemical device including an electrolyte is formed from the carbon nanofiber structure 400, the electrolyte can be easily and effectively transported to the interior of the carbon nanofiber aggregate layer 451 through the holes 452. Therefore, the carbon nanofiber structure 400 can form a carbon nanofiber electrode capable of imparting excellent electrochemical performance to the electrochemical device. Furthermore, the carbon nanofiber structure 400 has the carbon nanofiber aggregate layer 451 that is formed by aggregating plural strands of the carbon nanofibers 50 together, on the side of the one surface 10a of the base material 10, and in this carbon nanofiber aggregate layer 451, the holes 452 are formed by being surrounded by plural strands of the carbon nanofibers 50. That is, these holes 452 do not compartmentalize the carbon nanofiber aggregate layer 451. Therefore, when a carbon yarn formed by continuously joining plural strands of the carbon nanofibers 50 is pulled out from the carbon nanofiber aggregate layer 451, a longer carbon yarn can be obtained.

Furthermore, in the present embodiment, since the holes 452 are through-holes, when the carbon nanofiber structure 400 is applied to an electrode of an electrochemical device, the electrolyte can be transported more sufficiently to the interior of the carbon nanofiber aggregate layer 451, as compared with the case in which the holes 452 are not through-holes. As a result, more excellent electrochemical performance can be imparted to electrochemical devices.

Here, the carbon nanofiber aggregate layer 451 will be explained in detail.

In the carbon nanofiber aggregate layer 451, the hole diameter of the holes 452 may be 0.3 µm to 7 µm, but the hole diameter is preferably 0.3 µm to 6 µm, and more preferably 0.3 µm to 5 µm.

The total area of the holes 452 may be more than or equal to 1% and less than 40% relative to the apparent area of the upper end surface 451a of the carbon nanofiber aggregate layer 451, but the total area is preferably more than or equal to 1% and less than 30%, and more preferably more than or equal to 1% and less than 20%.

The length along the direction of orientation of the carbon nanofibers 50 may be smaller than or equal to the maximum value of the hole diameter of the holes 452, or may be larger than the maximum value of the hole diameter; however, the carbon nanofiber structure 400 of the present embodiment is useful when the length along the direction of orientation of the carbon nanofibers 50 is larger than the maximum value of the hole diameter of the holes 452. This is because as the length along the direction of orientation of the carbon nanofibers 50 is larger than the maximum value of the hole diameter of the holes 452, there is an increasing necessity for transporting the electrolyte to the carbon nanofiber aggregate layer 451 in order to enhance the electrochemical performance of electrochemical devices. Specifically, when the length along the direction of orientation of the carbon nanofibers 50 is 10 to 100 times the maximum value of the hole diameter of the holes 452, the carbon nanofiber structure 400 is particularly useful.

Next, the method for producing the carbon nanofiber structure 400 will be described.

<Preparation Step>

Figure 14:
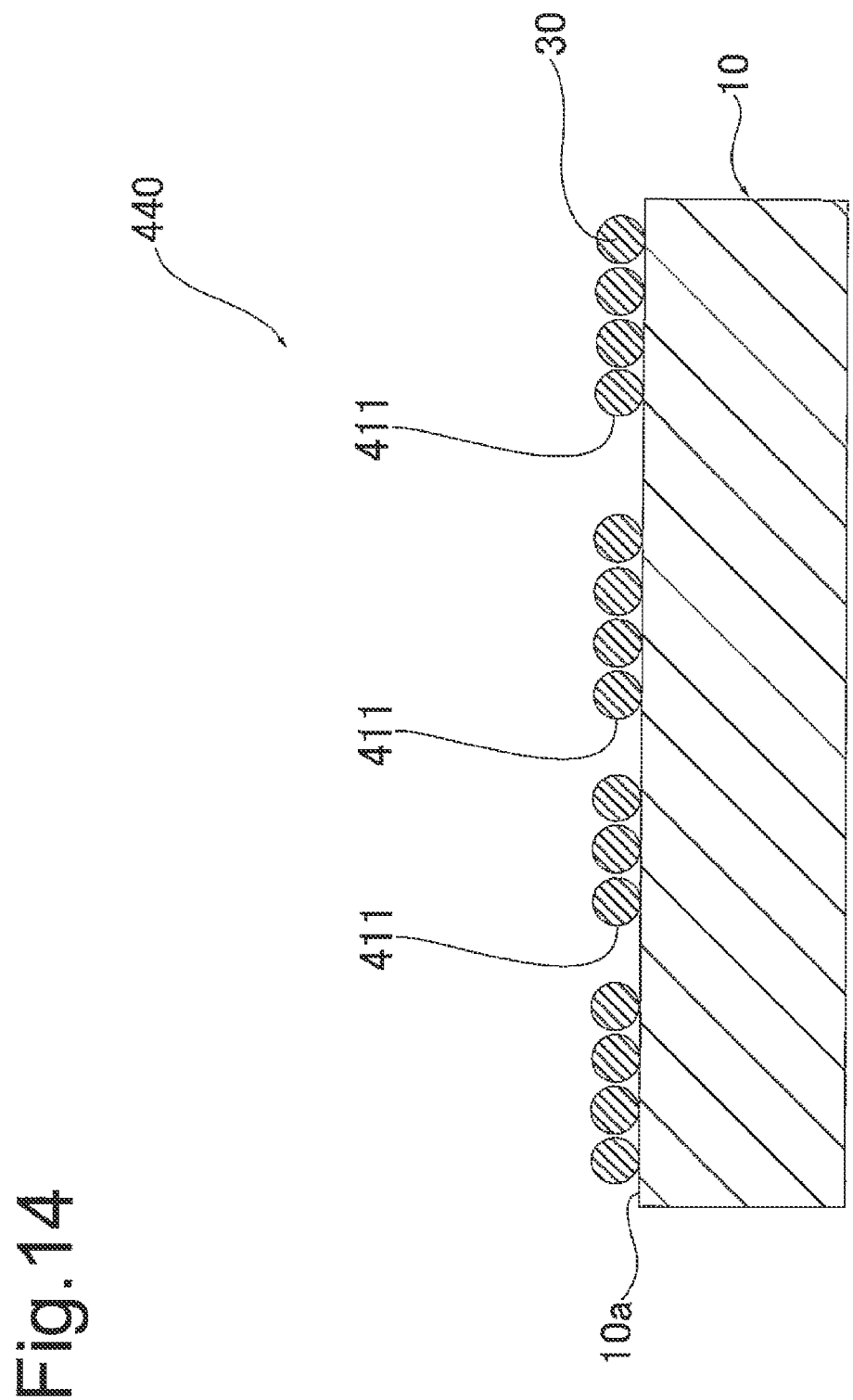
FIG. 14 is an end view of a cut surface illustrating the structure for forming carbon nanofiber of FIG. 12.

First, a structure for forming carbon nanofiber 440 that is formed by providing a metal catalyst 40 on one surface 10a of a base material 10, is prepared (see FIG. 14). The structure for forming carbon nanofiber 440 is formed, for example, in the following manner.

First, as illustrated in FIG. 3, a base material 10 is prepared.

Figure 15:
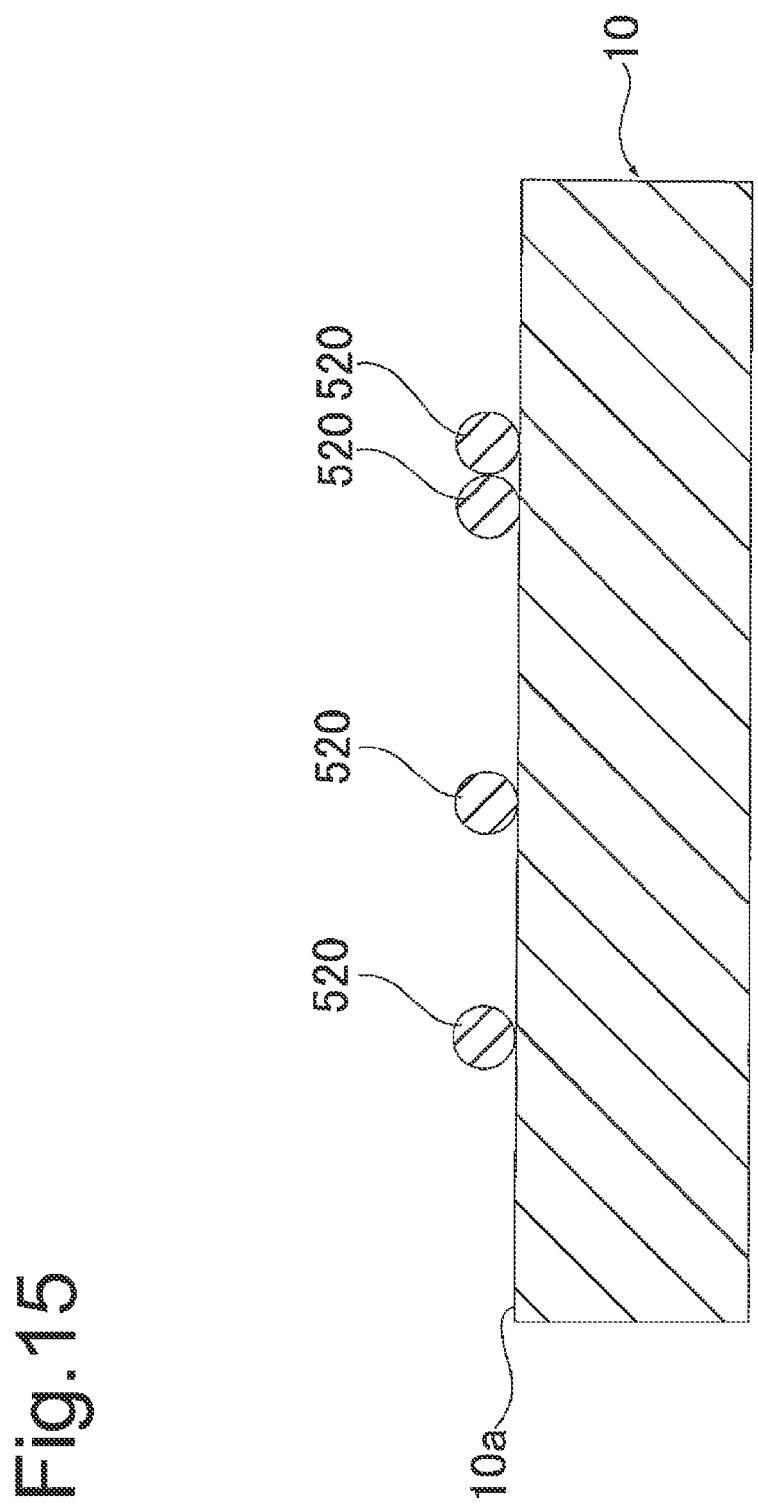
FIG. 15 is an end view of a cut surface illustrating the state in which masking particles are disposed on one surface of the base material of FIG. 3.

Next, as illustrated in FIG. 15, for example, masking particles 520 that serve as a mask for alumina particles or the like, are disposed on the one surface 10a of the base material 10. At this time, the average particle size of the masking particles 520 is appropriately adjusted according to the bore diameter of the bores 411 to be formed. For example, in the case of forming bores 411 having a bore diameter of 0.3 μm to 7 μm, the particle size of the masking particles 520 may be adjusted to, for example, about 1 μm, and the masking particles 520 may be disposed at a concentration at which these particles appropriately aggregate. As the masking particles, for example, inorganic substances such as alumina particles, zirconium oxide particles, or combinations of two or more kinds thereof can be used.

(Catalyst Supporting Step)

Figure 16:
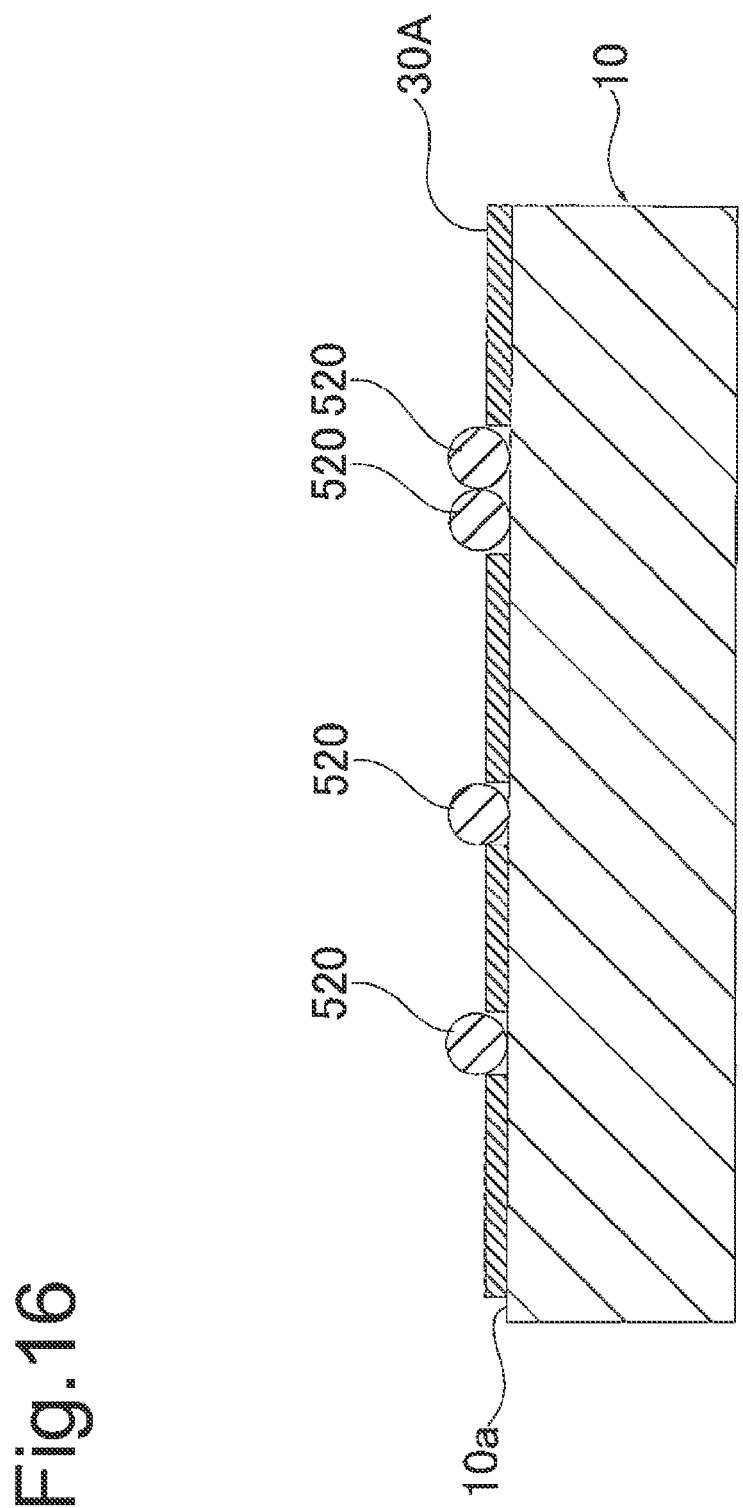
FIG. 16 is an end view of a cut surface illustrating the state in which masking particles and a metal catalyst film are formed on one surface of the base material of FIG. 3.
Figure 17:
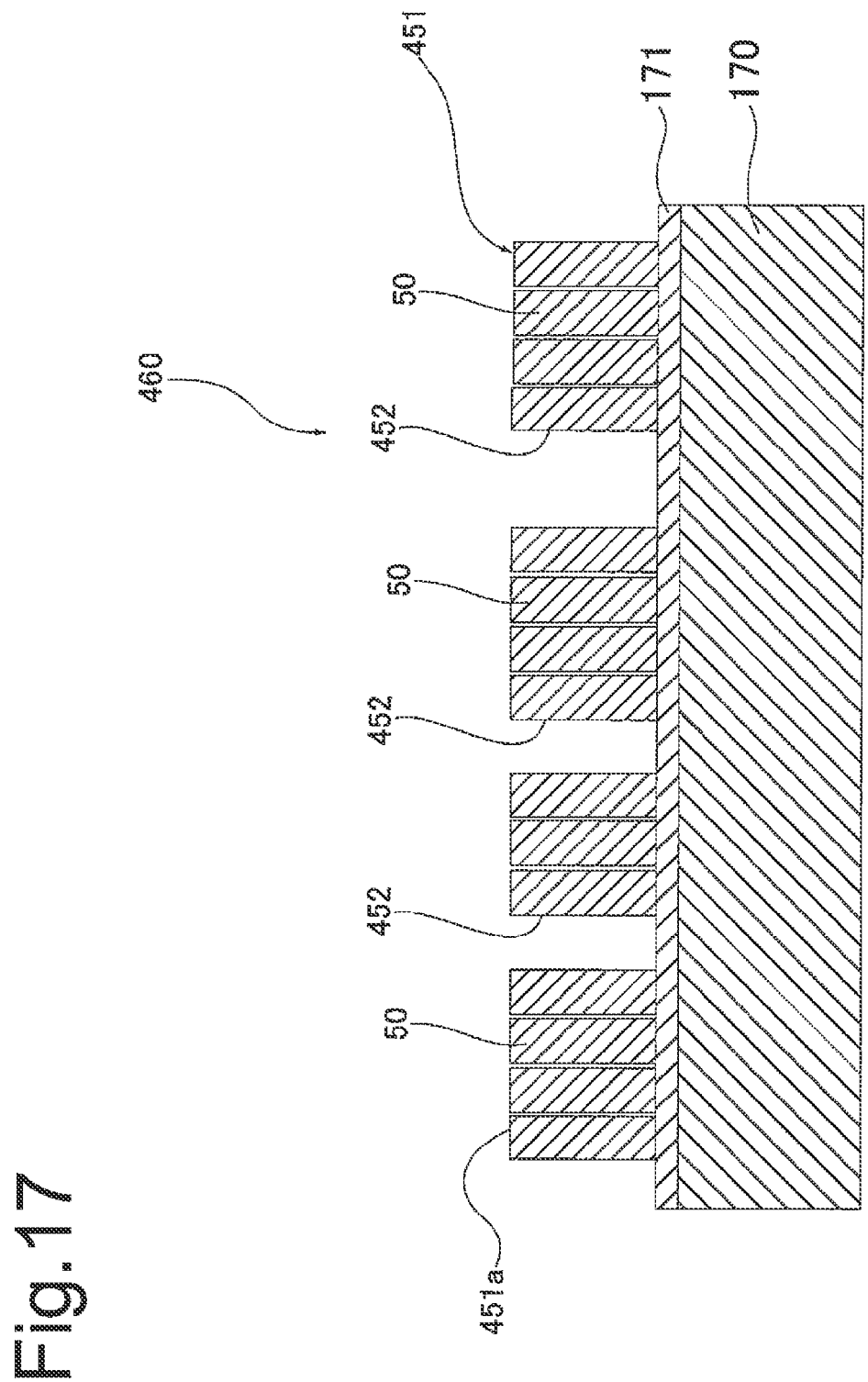
FIG. 17 is an end view illustrating another embodiment of a carbon nanofiber electrode according to the present invention.

Next, as illustrated in FIG. 16, a metal catalyst film 30A is supported on the one surface 10a of the base material 10.

As the metal catalyst that constitutes the metal catalyst film 30A, a metal catalyst that is known to be used to grow the carbon nanofibers 50 can be used. As such a metal catalyst, the same catalyst as the metal catalyst 30 is used.

The thickness of the metal catalyst film 30A may be, for example, 0.5 nm to 10 nm.

Next, the masking particles 520 are removed. The removal of the masking particles 520 can be carried out by, for example, supplying an alcohol.

Thereafter, the metal catalyst film 31A is heated in a reducing atmosphere, and thereby the particulate metal catalysts 30 are formed.

The average particle size of the particulate metal catalysts 30 is usually 1 nm to 50 nm, but the average particle size is preferably 2 nm to 25 nm. In this case, the carbon nanofibers 50 can be grown more effectively as compared with the case in which the average particle size is not in the range of 2 nm to 25 nm.

In this manner, the structure for forming carbon nanofiber 440 on which bores 411 are formed on one surface on the side of the metal catalyst 30 is obtained.

Here, the bore diameter of the bores 411 may be 0.3 μm to 7 μm, but the bore diameter is preferably 0.3 μm to 6 μm, and more preferably 0.3 μm to 5 μm.

Furthermore, the total area of the bores 411 may be more than or equal to 1% and less than 40% relative to the area of the catalyst supporting surface on which the metal catalyst 30 is provided in the one surface 10a of the base material 10, but the total area is preferably more than or equal to 1% and less than 30%, and more preferably more than or equal to 1% and less than 20%.

<Carbon Nanofiber Growing Step>

Next, in the same manner as in the first to fourth aspects of the method for producing the carbon nanofiber structure 100, a raw material gas containing carbon is supplied to the metal catalyst 30 by a CVD method, and carbon nanofibers 50 are grown on the metal catalyst 30 of the structure for forming carbon nanofibers 440.

In this manner, a carbon nanofiber structure 400 including a carbon nanofiber aggregate layer 451 in which holes 452 each having a hole diameter of 0.3 μm to 7 μm are formed, and the total area of the holes 452 is more than or equal to 1% and less than 40% relative to the apparent area of the upper end surface 451a of the carbon nanofiber aggregate layer 451, is obtained (FIG. 12). Here, the apparent area of the upper end surface 451a is the same as the area of the catalyst supporting surface in the one surface 10a of the base material 10.

When the carbon nanofiber structure 400 is produced as described above, on the occasion of growing the carbon nanofibers 50 by a CVD method in the carbon nanofiber growing step, a raw material gas containing carbon is supplied to the metal catalyst 30. At this time, the raw material gas diffuses into the metal catalyst 30, and carbon nanofibers 50 are precipitated from the surface of the metal catalyst 30. While the activity of the metal catalyst 30 is maintained, this diffusion and precipitation occur continuously, and thus carbon nanofibers 50 grow. At this time, generally, as the carbon nanofibers 50 grow, the carbon nanofibers 50 growing on the metal catalyst 30 that is provided on the side of the one surface 10a of the base material 10, inhibit the diffusion of the gas, and make the gas supply to the metal catalyst 30 difficult. As a result, in the metal catalyst 30, there occurs a difference in the amount of supply of the raw material gas between the exposed sections that are exposed to the raw material gas, and the coated sections that are coated with the carbon nanofibers 50. That is, there occurs non-uniformity in terms of the amount of gas supply to the metal catalyst 30. Therefore, there is a difference in the growth rate of the carbon nanofibers 50 between the exposed sections and the coated sections. This becomes significant as the surface area of the carbon nanofiber aggregate layer 451 is enlarged.

From that point of view, in the method for producing the carbon nanofiber structure 400 described above, the bores that are formed on the side of the metal catalyst 30 of the structure for forming carbon nanofiber 440 and each have a bore diameter of 0.3 μm to 7 μm, are formed such that the total area is at an area ratio of more than or equal to 1% and less than 40% relative to the area of the catalyst supporting surface on which the metal catalyst 30 is provided in the one surface 10a of the base material 10. As a result, the following operation and effect are provided.

That is, first, the carbon nanofibers 50 grow on the metal catalyst 30 toward a direction B away from the one surface 10a of the base material 10. In other words, the carbon nanofibers 50 grow on the region in the one surface 10a of the base material 10, excluding the region where the metal catalyst 30 is not formed, toward a direction B away from the one surface 10a of the base material 10. Then, the carbon nanofiber aggregate layer 451 formed by aggregating plural strands of growing carbon nanofibers 50, is formed. At this time, holes 452 each having a hole diameter of 0.3 μm to 7 μm are formed by plural strands of the carbon nanofibers 50, at the same area ratio as the area ratio of the bores 411 formed on the side of the metal catalyst 30 of the structure for forming carbon nanofiber 440. That is, in the carbon nanofiber aggregate layer 451, holes 452 each having a hole diameter of 0.3 μm to 7 μm are formed such that the total area is more than or equal to 1% and less than 40% relative to the apparent area of the upper end surface 451a of the carbon nanofiber aggregate layer 451. Then, the raw material gas can diffuse into the interior of the carbon nanofiber aggregate layer 451 through the holes 452, and can easily reach the metal catalyst 30. As a result, the difference in the amount of supply of the raw material gas between the exposed sections and the coated sections in the metal catalyst 30 can be made small, and the difference in the growth rate of the carbon nanofibers 50 in the two areas can be made small.

Therefore, even if the carbon nanofibers 50 grow long, the carbon nanofibers 50 being bent can be suppressed satisfactorily. Furthermore, the growing plural carbon nanofibers 50 are also sufficiently prevented from inhibiting the growth of one another, and therefore, the productivity of the carbon nanofibers 50 can be sufficiently increased.

Furthermore, the carbon nanofiber structure 400 thus obtainable is such that in the carbon nanofiber aggregate layer 451 provided on the side of the one surface 10a of the base material 10, holes 452 each having a hole diameter of 0.3 μm to 7 μm are appropriately formed by being surrounded by plural strands of the carbon nanofibers 50. Therefore, for example, when an electrode of an electrochemical device including an electrolyte is formed from the carbon nanofiber structure 400, the electrolyte can be easily and effectively transported to the interior of the carbon nanofiber aggregate layer 451 through the holes 452. Therefore, the carbon nanofiber structure 400 obtainable as described above can form a carbon nanofiber electrode that is capable of imparting excellent electrochemical performance to electrochemical devices.

Furthermore, the carbon nanofiber structure 400 obtainable as described above has a carbon nanofiber aggregate layer 451 formed by aggregating plural strands of the carbon nanofibers 50, on the side of the one surface 10a of the base material 10, and in this carbon nanofiber aggregate layer 451, the holes 452 are formed by being surrounded by plural strands of the carbon nanofibers 50. That is, these holes 452 do not compartmentalize the carbon nanofiber aggregate layer 451. Therefore, when a carbon yarn formed by continuously joining plural strands of the carbon nanofibers 50 is pulled out from the carbon nanofiber aggregate layer 451, a longer carbon yarn can be obtained.

When a carbon nanofiber electrode is formed using the carbon nanofiber structure 400 thus formed, the carbon nanofiber electrode can be formed by transferring the carbon nanofiber aggregate layer 451 of the carbon nanofiber structure 400 to a conductive substrate for electrodes. Transfer of the carbon nanofiber aggregate layer 451 to a conductive substrate for electrodes may be carried out by, for example, interposing a conductive adhesive film between the carbon nanofiber aggregate layer and the conductive substrate for electrodes, and pressing the assembly. Examples of the conductive substrate for electrodes include a titanium substrate. Meanwhile, when a conductive material is used as the base material 10, a carbon nanofiber electrode is formed directly by the carbon nanofiber structure 400.

<Fifth Embodiment>

Figure 18:
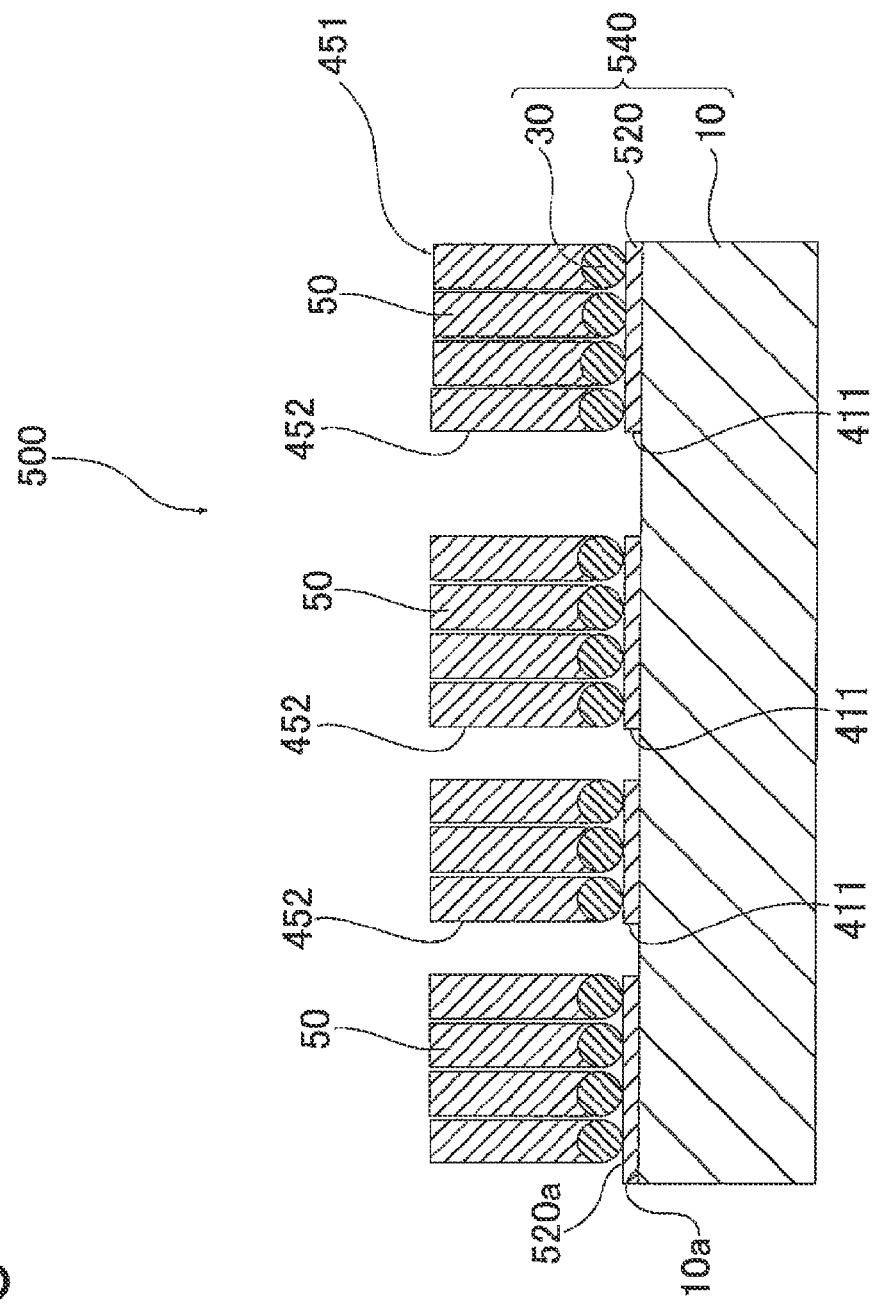
FIG. 18 is an end view of a cut surface illustrating a fifth embodiment of the carbon nanofiber structure according to the present invention.

Next, a fifth embodiment of the carbon nanofiber structure of the present invention will be described with reference to FIG. 18. FIG. 18 is an end view of a cut surface illustrating the fifth embodiment of the carbon nanofiber structure of the present invention. As illustrated in FIG. 18, the carbon nanofiber structure 500 of the present embodiment is different from the carbon nanofiber structure 400 of the fourth embodiment in that the carbon nanofiber structure 500 further includes a metal oxide layer 520 between the one surface 10a of the base material 10 and the metal catalyst 30, and the metal oxide layer 520 has a thickness of 0.5 nm to 10 nm.

According to the carbon nanofiber structure 500 of the present embodiment, when carbon nanofibers 50 are grown by a CVD method on the metal catalyst 30 of the structure for forming carbon nanofiber 540, the carbon nanofibers 50 can be grown satisfactorily on the metal oxide layer 520.

The metal oxide layer 520 is formed of a metal oxide. The metal oxide is desirably the same material as the metal oxide that constitutes the metal oxide layer 20, but it is preferable that the metal oxide be an oxide of a Group II or Group III metal, from the viewpoint of thermodynamic stability in a reducing atmosphere. Among them, the metal oxide is more preferably an oxide of a Group III metal from the viewpoint of the catalyst supporting function. Examples of the oxide of the Group III metal include aluminum oxide, magnesium aluminate, and cerium oxide, but aluminum oxide is most preferred. In this case, the carbon nanofibers 50 can be grown more satisfactorily as compared with the case in which the metal oxide is a metal oxide other than aluminum oxide.

In the present embodiment, the thickness of the metal oxide layer 520 is preferably 1 nm to 8 nm. In this case, the carbon nanofibers 50 can be grown more effectively as compared with the case in which the thickness of the metal oxide layer 520 is not in the range of 1 nm to 8 nm.

The metal oxide layer 520 can be formed, for example, according to a sputtering method. At this time, the target may be a metal element or may be a metal oxide, but it is necessary to supply oxygen gas at an appropriate concentration depending on the kind of the target. At this time, the temperature of the base material 10 is preferably set to 20° C. to 300° C., for the reason that the adhesiveness between the base material 10 and the metal oxide layer 520 is enhanced.

Figure 19:
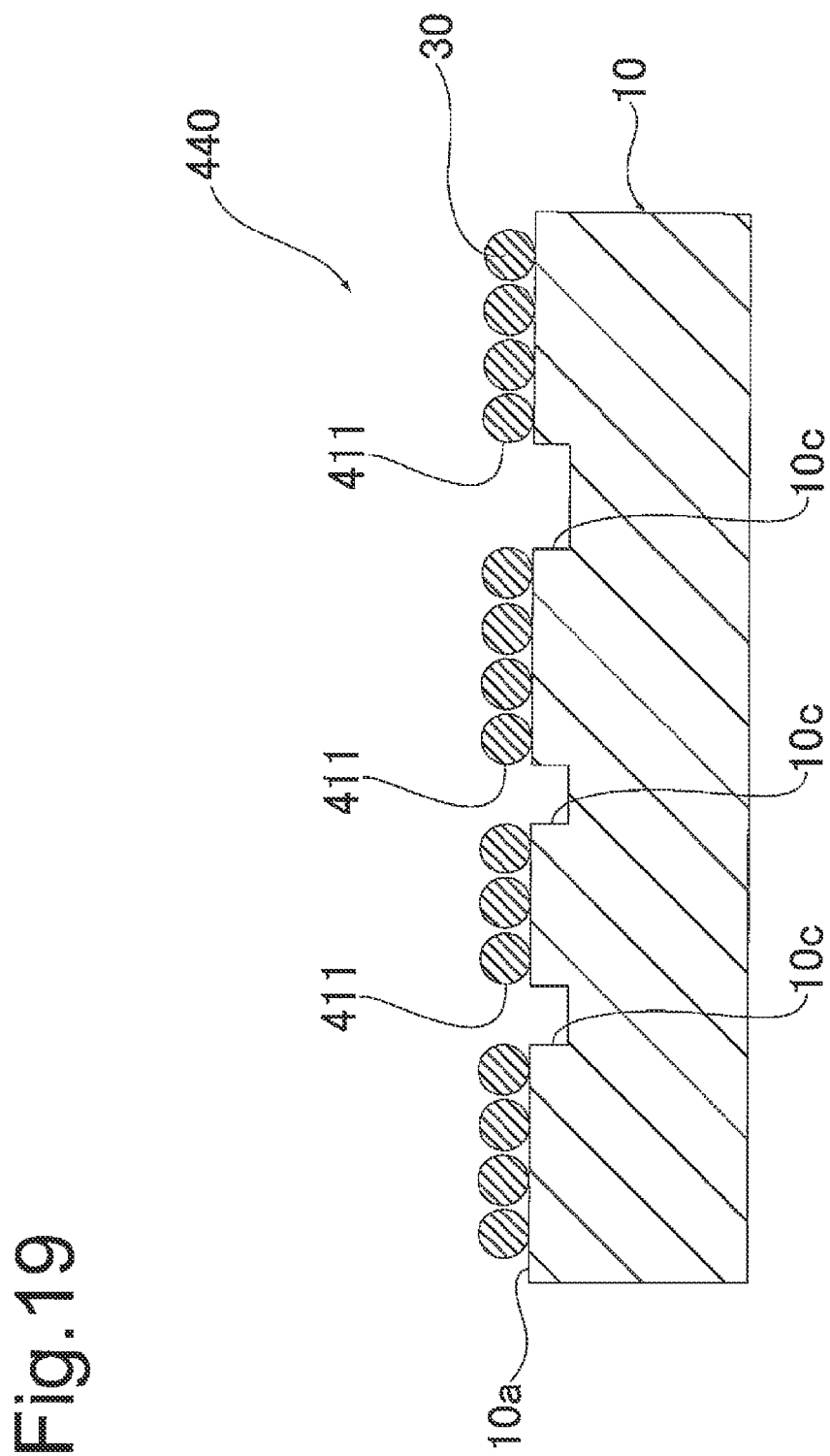
FIG. 19 is an end view of a cut surface illustrating a modification example of the structure for forming carbon nanofiber that is included in the carbon nanofiber structure of FIG. 12.

The present invention is not intended to be limited to the first to fifth embodiments described above. For example, in the fourth embodiment, regarding the method of forming bores 411 on one surface 10a on the side of the metal catalyst 30 of the structure for forming carbon nanofiber 440, bores 411 are formed by disposing masking particles 520 on the one surface 10a of the base material 10 to form a metal catalyst film 30A, and then eliminating the masking particles 520. However, the bores 411 can also be formed by other methods. That is, examples include a method of forming a mask on the one surface 10a of the base material 10 by lithography, subsequently supporting the metal catalyst 30, and then removing the mask; a method of forming the bores 411 by eliminating a portion of the supported metal catalyst 30 using a laser; a method of eliminating a portion of the supported metal catalyst 30 by ultrasonic cavitation; and a method of forming the bores 411 by polishing the surface of a sintered product to form depressions, and then supporting the metal catalyst 30 on the regions where the depressions are not formed. Alternatively, as illustrated in FIG. 19, the bores 411 may also be formed by forming openings 10c on the one surface 10a of the base material 10, and forming the metal catalyst 30 on the regions excluding these openings 10c in the one surface 10a of the base material 10.

Furthermore, in the fourth and the fifth embodiments, the holes 452 are through-holes for the carbon nanofiber aggregate layer 451, but the holes 452 may not be necessarily through-holes in the carbon nanofiber aggregate layer 451.

EXAMPLES

Hereinafter, the matters of the present invention will be more specifically described by way of Examples, but the present invention is not intended to be limited to the Examples described below.

Example 1

A plate-shaped yttria-stabilized zirconia base material (containing 10 mol % of yttria) having a thickness of 1000

μm was prepared as a base material. On this base material, an aluminum oxide layer ($AlO_x$) having a thickness of 2 nm was formed by sputtering. At this time, a target of elemental aluminum (99.99%) was used, and sputtering was carried out at a pressure of 0.007 Torr by supplying argon at a flow rate of 17 sccm and oxygen at a flow rate of 3 sccm.

Subsequently, a thin film of iron having a thickness of 2 nm that would serve as a catalyst was formed on the surface of the aluminum oxide layer by a sputtering method. In this manner, a laminate composed of a base material, an aluminum oxide layer and an iron thin film was obtained.

Next, this laminate was accommodated in an electric furnace set at a temperature of 800° C. At this time, argon gas at atmospheric pressure was supplied to the electric furnace at a flow rate of 500 sccm. Furthermore, the opening on one end side of a cylindrical body formed of aluminum oxide, which was intended to supply gas through the back surface of the laminate, was disposed to be blocked by the base material. Then, argon gas at atmospheric pressure was supplied to the interior of the cylindrical body at a flow rate of 250 sccm.

After the temperature of the base material was stabilized, hydrogen gas was mixed into the argon gas at a proportion of 2.5% by volume, the thin film of iron was reduced, and thus catalyst particles having an average particle size of 5 nm were formed on the aluminum oxide layer. Thus, a structure for forming carbon nanofiber was obtained.

Next, acetylene gas was supplied into the argon gas to be supplied to the inside of the electric furnace, at a proportion of 2.5% by volume.

In this manner, carbon nanofibers were grown on the catalyst particles over 10 minutes, and thus a carbon nanofiber structure was obtained.

Example 2

A carbon nanofiber structure was obtained in the same manner as in Example 1, except that the aluminum oxide layer was formed to have a thickness of 4 nm.

Example 3

A carbon nanofiber structure was obtained in the same manner as in Example 1, except that the aluminum oxide layer was formed to have a thickness of 8 nm.

Example 4

A carbon nanofiber structure was obtained in the same manner as in Example 1, except that the aluminum oxide layer was formed to have a thickness of 10 nm.

Example 5

A carbon nanofiber structure was obtained in the same manner as in Example 1, except that the aluminum oxide layer was formed to have a thickness of 20 nm.

Example 6

A carbon nanofiber structure was obtained in the same manner as in Example 1, except that the aluminum oxide layer was formed to have a thickness of 0.5 nm.

Example 7

A plate-shaped yttria-stabilized zirconia base material (containing 10 mol % of yttria) having a thickness of 1000 μm was prepared as a base material. On this base material, an aluminum oxide layer ($AlO_x$) having a thickness of 2 nm was formed by sputtering. At this time, a target of elemental aluminum (99.99%) was used, and sputtering was carried out at a pressure of 0.007 Torr by supplying argon at a flow rate of 17 sccm and oxygen at a flow rate of 3 sccm.

Subsequently, a thin film of iron having a thickness of 2 nm that would serve as a catalyst was formed on the surface of the aluminum oxide layer by a sputtering method. In this manner, a laminate composed of a base material, an aluminum oxide layer and an iron thin film was obtained.

Next, this laminate was accommodated in an electric furnace set at a temperature of 800° C. At this time, argon gas at atmospheric pressure was supplied to the electric furnace at a flow rate of 500 sccm. Furthermore, the opening on one end side of a cylindrical body formed of aluminum oxide, which was intended to supply gas through the back surface of the laminate, was disposed to be blocked by the base material. Then, argon gas at atmospheric pressure was supplied to the interior of the cylindrical body at a flow rate of 100 sccm.

After the temperature of the base material was stabilized, hydrogen gas was mixed into the argon gas to be supplied to the inside of the electric furnace at a proportion of 2.5% by volume, the thin film of iron was reduced, and thus catalyst particles having an average particle size of 5 nm were formed on the aluminum oxide layer. Thus, a structure for forming carbon nanofiber was obtained.

Next, acetylene gas was supplied into the argon gas to be supplied to the inside of the electric furnace, at a proportion of 2.5% by volume, and then air, with the oxygen concentration being adjusted to 2% by volume, was supplied into the argon gas to be supplied to the inside of the cylindrical body.

In this manner, carbon nanofibers were grown on the catalyst particles over 10 minutes, and thus a carbon nanofiber structure was obtained.

Example 8

A carbon nanofiber structure was obtained in the same manner as in Example 7, except that the aluminum oxide layer was formed to have a thickness of 4 nm.

Example 9

A carbon nanofiber structure was obtained in the same manner as in Example 7, except that the aluminum oxide layer was formed to have a thickness of 8 nm.

Example 10

A carbon nanofiber structure was obtained in the same manner as in Example 7, except that the aluminum oxide layer was formed to have a thickness of 10 nm.

Example 11

A carbon nanofiber structure was obtained in the same manner as in Example 7, except that the aluminum oxide layer was formed to have a thickness of 20 nm.

Example 12

A carbon nanofiber structure was obtained in the same manner as in Example 7, except that the aluminum oxide layer was formed to have a thickness of 0.5 nm.

Example 13

A carbon nanofiber structure was obtained in the same manner as in Example 1, except that the material that constituted the base material was changed from yttria-stabilized zirconia to strontium titanate.

Example 14

A carbon nanofiber structure was obtained in the same manner as in Example 1, except that the material that constituted the base material was changed from yttria-stabilized zirconia to calcia-stabilized zirconia (containing 11 mol % of calcia).

Example 15

A carbon nanofiber structure was obtained in the same manner as in Example 1, except that after the structure for forming carbon nanofiber was obtained, oxygen gas was mixed into the argon gas to be supplied into the electric furnace (atmosphere) to have a concentration of 0.012% by volume, and the mixed gas was supplied.

Example 16

A carbon nanofiber structure was obtained in the same manner as in Example 7, except that after the structure for forming carbon nanofiber was obtained, oxygen gas was mixed into the argon gas to be supplied into the electric furnace (atmosphere) to have a concentration of 0.012% by volume, and the mixed gas was supplied.

Example 17

A carbon nanofiber structure was obtained in the same manner as in Example 1, except that the material that constituted the metal catalyst was changed from iron to nickel.

Example 18

A carbon nanofiber structure was obtained in the same manner as in Example 1, except that the material that constituted the metal catalyst was changed from iron to cobalt.

Example 19

A carbon nanofiber structure was obtained in the same manner as in Example 1, except that the material that constituted the metal catalyst was changed from iron to an iron-molybdenum alloy.

Example 20

A carbon nanofiber structure was obtained in the same manner as in Example 1, except that the material that constituted the metal oxide layer was changed from aluminum oxide to magnesium aluminate.

Example 21

A carbon nanofiber structure was obtained in the same manner as in Example 1, except that the material that constituted the metal oxide layer was changed from aluminum oxide to magnesium oxide.

Example 22

A carbon nanofiber structure was obtained in the same manner as in Example 1, except that the material that constituted the metal oxide layer was changed from aluminum oxide to cerium oxide.

Example 23

A carbon nanofiber structure was obtained in the same manner as in Example 1, except that the aluminum oxide layer was formed to have a thickness of 1 nm.

Comparative Example 1

A carbon nanofiber structure was obtained in the same manner as in Example 1, except that the material that constituted the base material was changed from yttria-stabilized zirconia to a plate-shaped silicon material having a thickness of 500 µm.

Comparative Example 2

A carbon nanofiber structure was obtained in the same manner as in Example 1, except that the material that constituted the base material was changed from yttria-stabilized zirconia to a plate-shaped titanium material having a thickness of 100 µm.

Comparative Example 3

A carbon nanofiber structure was obtained in the same manner as in Example 1, except that the material that constituted the base material was changed from yttria-stabilized zirconia to dense alumina (aluminum oxide).

Comparative Example 4

A carbon nanofiber structure was obtained in the same manner as in Example 7, except that the material that constituted the base material was changed from yttria-stabilized zirconia to dense alumina (aluminum oxide).

Comparative Example 5

A plate-shaped titanium base material having a thickness of 100 µm was prepared as the base material. On this base material, an aluminum oxide layer ($AlO_x$) having a thickness of 0.3 nm was formed by a sputtering method. At this time, a target of elemental aluminum (99.99%) was used, and sputtering was carried out at a pressure of 0.007 Torr by supplying argon at a flow rate of 17 sccm and oxygen at a flow rate of 3 sccm.

Subsequently, a thin film of iron having a thickness of 2 nm that would serve as a catalyst was formed on the surface of the aluminum oxide layer by a sputtering method. In this manner, a laminate composed of a base material, an aluminum oxide layer and an iron thin film was obtained.

Next, this laminate was accommodated in an electric furnace set at a temperature of 800° C. At this time, argon gas at atmospheric pressure was supplied to the electric furnace at a flow rate of 500 sccm.

After the temperature of the base material was stabilized, hydrogen gas was mixed into the argon gas at a proportion of 10% by volume, the thin film of iron was reduced, and thus catalyst particles having an average particle size of 5 nm were formed on the aluminum oxide layer. Thus, a structure for forming carbon nanofiber was obtained.

Next, acetylene gas was supplied into the argon gas to be supplied to the inside of the electric furnace, at a proportion of 2.5% by volume.

However, carbon nanofibers grew sparsely in the manner of stretching across the base material, and thus a carbon nanofiber structure could not be obtained. When the surface of the base material was observed by scanning electron microscopy, cracks were generated on the surface as a result of hydrogen embrittlement, and the surface had surface asperities. Furthermore, when the surface of the base material was subjected to a composition analysis based on X-ray, the base material and the catalyst were in an alloyed state. Therefore, it is speculated that the growth of the carbon nanofibers was inhibited.

Comparative Example 6

A plate-shaped silicone base material having a thickness of 500 μm was prepared as the base material. On this base material, an aluminum oxide layer ($AlO_x$) having a thickness of 0.3 nm was formed by sputtering. At this time, a target of elemental aluminum (99.99%) was used, and sputtering was carried out at a pressure of 0.007 Torr by supplying argon at a flow rate of 17 sccm and oxygen at a flow rate of 3 sccm.

Subsequently, a thin film of iron having a thickness of 2 nm that would serve as a catalyst was formed on the surface of the aluminum oxide layer by a sputtering method. In this manner, a laminate composed of a base material, an aluminum oxide layer and an iron thin film was obtained.

Next, this laminate was accommodated in an electric furnace set at a temperature of 800° C. At this time, argon gas at atmospheric pressure was supplied to the electric furnace at a flow rate of 500 sccm.

After the temperature of the base material was stabilized, hydrogen gas was mixed into the argon gas at a proportion of 10% by volume, the thin film of iron was reduced, and thus catalyst particles having an average particle size of 5 nm were formed on the aluminum oxide layer. Thus, a structure for forming carbon nanofiber was obtained.

Next, acetylene gas was supplied into the argon gas to be supplied to the inside of the electric furnace, at a proportion of 2.5% by volume.

However, carbon nanofibers grew sparsely in the manner of stretching across the base material, and thus a carbon nanofiber structure could not be obtained. When the surface of the base material was subjected to a composition analysis based on X-ray, the base material and the catalyst were in an alloyed state. Therefore, it is speculated that the growth of the carbon nanofibers was inhibited thereby.

Example 24

A plate-shaped yttria-stabilized zirconia base material (containing 17 mol % of yttria) having a thickness of 1000 μm that would serve as the base material, was prepared.

Subsequently, a thin film of iron having a thickness of 2 nm that would serve as a catalyst was formed on the surface of the base material by a sputtering method. In this manner, a laminate composed of a base material and an iron thin film was obtained.

Next, this laminate was accommodated in an electric furnace set at a temperature of 800° C. At this time, argon gas at atmospheric pressure was supplied to the electric furnace at a flow rate of 500 sccm. Furthermore, the laminate was disposed such that the opening on one end side of a cylindrical body formed of aluminum oxide, which was intended for supplying gas, would be blocked by the base material. Then, argon gas at atmospheric pressure was supplied into the inside of the cylindrical body at a flow rate of 100 sccm.

After the temperature of the base material was stabilized, hydrogen gas was mixed into the argon gas to be supplied to the inside of the electric furnace at a proportion of 10% by volume, the thin film of iron was reduced, and thus catalyst particles having an average particle size of 5 nm were formed. Thus, a structure for forming carbon nanofiber was obtained.

Next, acetylene gas was supplied into the argon gas to be supplied to the inside of the electric furnace, at a proportion of 2.5% by volume.

In this manner, carbon nanofibers were grown on the catalyst particles over 10 minutes, and thus a carbon nanofiber structure was obtained.

Example 25

A carbon nanofiber structure was obtained in the same manner as in Example 24, except that the material that constituted the base material was changed from yttria-stabilized zirconia to strontium titanate.

Example 26

A carbon nanofiber structure was obtained in the same manner as in Example 24, except that the supply of an argon gas containing 0.1% by volume of oxygen was further carried out through the cylindrical body through the surface on the opposite side of the catalyst (back surface) in the base material.

Example 27

A carbon nanofiber structure was obtained in the same manner as in Example 24, except that the material that constituted the metal catalyst was changed from iron to nickel.

Example 28

A carbon nanofiber structure was obtained in the same manner as in Example 24, except that the material that constituted the metal catalyst was changed from iron to cobalt.

Example 29

A carbon nanofiber structure was obtained in the same manner as in Example 24, except that the material that constituted the metal catalyst was changed from iron to an iron-molybdenum alloy.

Comparative Example 7

It was attempted to obtain a carbon nanofiber structure in the same manner as in Example 24, except that the material that constituted the base material was changed from yttria-stabilized zirconia to a plate-shaped silicon material having a thickness of 500 μm. However, carbon nanofibers grew sparsely in the manner of stretching across the base material, and thus a carbon nanofiber structure could not be obtained.

When the surface of the base material was subjected to a composition analysis based on X-ray, the base material and the catalyst were in an alloyed state. Therefore, it is speculated that the growth of the carbon nanofibers was inhibited.

Comparative Example 8

It was attempted to obtain a carbon nanofiber structure in the same manner as in Example 24, except that the material that constituted the base material was changed from yttria-stabilized zirconia to a plate-shaped titanium material having a thickness of 100 µm. However, carbon nanofibers grew sparsely in the manner of stretching across the base material, and thus a carbon nanofiber structure could not be obtained. When the surface was observed by scanning electron microscopy, cracks were generated on the surface as a result of hydrogen embrittlement, and the surface had surface asperities. When the surface of the base material was subjected to a composition analysis based on X-ray, the base material and the catalyst were in an alloyed state. Therefore, it is speculated that the growth of the carbon nanofibers was inhibited thereby.

Comparative Example 9

A carbon nanofiber structure was obtained in the same manner as in Example 24, except that the material that constituted the base material was changed from yttria-stabilized zirconia to dense alumina (aluminum oxide).

Example 30

A plate-shaped yttria-stabilized zirconia base material (containing 10 mol % of yttria) having a thickness of 1000 µm was prepared as a base material. Then, alumina fine particles having a diameter of 1 µm were dispersed on the surface of the base material. On the surface of this yttria-stabilized zirconia substrate, a thin film of iron having a thickness of 2 nm that would serve as a catalyst was formed by using a sputtering method. Thereafter, the alumina fine particles were removed with an alcohol, and the yttria-stabilized zirconia substrate was dried. In this manner, a laminate composed of an yttria-stabilized zirconia substrate and an iron thin film was obtained. At this time, bores having a distribution of a bore diameter of 0.7 µm to 5 µm were formed in a dispersed manner in the iron thin film.

Next, this laminate was accommodated in an electric furnace set at a temperature of 800° C. At this time, argon gas at atmospheric pressure was supplied to the electric furnace at a flow rate of 500 sccm.

After the temperature of the yttria-stabilized zirconia substrate was stabilized, hydrogen gas was mixed into the argon gas at a proportion of 2.5% by volume, the thin film of iron was reduced, and catalyst particles having an average particle size of 5 nm were formed on the surface of the yttria-stabilized zirconia substrate. In this manner, a structure for forming carbon nanofiber was obtained. At this time, the ratio of the catalyst-supported area with respect to the catalyst-supported area of Example 38 was 0.92.

Next, acetylene gas was supplied into the argon gas to be supplied into the electric furnace, at a proportion of 2.5% by volume.

In this manner, carbon nanofibers were grown over 10 minutes toward a direction away from the catalyst particles, and thus a carbon nanofiber aggregate layer was formed. Thus, a carbon nanofiber structure was obtained. In the carbon nanofiber structure thus obtained, holes having a distribution of a hole diameter of 0.7 µm to 5 µm were formed in a dispersed manner in the carbon nanofiber aggregate layer. At this time, the total area of the holes was 8% of the apparent area of the upper end of the carbon nanofiber structure (hereinafter, referred to as "apparent upper end area"). Furthermore, the length of the carbon nanofibers (CNF) was 130 µm.

Example 31

A carbon nanofiber structure was obtained in the same manner as in Example 30, except that alumina fine particles having a diameter of 1 µm were dispersed on the surface of the yttria-stabilized zirconia substrate, bores having a distribution of a bore diameter of 0.7 µm to 3 µm were formed in a dispersed manner in the iron thin film, and the ratio of the catalyst-supported area with respect to the catalyst-supported area of Example 38 was adjusted as indicated in Table 6. In the carbon nanofiber structure thus obtained, holes having a distribution of a hole diameter of 0.7 µm to 3 µm were formed in a dispersed manner in the carbon nanofiber aggregate layer. At this time, the total area of the holes was 1% of the apparent upper end area of the carbon nanofiber structure. Furthermore, the length of the carbon nanofibers was 130 µm.

Example 32

A carbon nanofiber structure was obtained in the same manner as in Example 30, except that alumina fine particles having a diameter of 1 µm were dispersed on the surface of the yttria-stabilized zirconia substrate, bores having a distribution of a bore diameter of 2 µm to 7 µm were formed in a dispersed manner in the iron thin film, and the ratio of the catalyst-supported area with respect to the catalyst-supported area of Example 38 was adjusted as indicated in Table 6. In the carbon nanofiber structure thus obtained, holes having a distribution of a hole diameter of 2 µm to 7 µm were formed in a dispersed manner in the carbon nanofiber aggregate layer. At this time, the total area of the holes was 39% of the apparent upper end area of the carbon nanofiber structure. Furthermore, the length of the carbon nanofibers was 140 µm.

Example 33

A plate-shaped yttria-stabilized zirconia base material (containing 10 mol % of yttria) having a thickness of 1000 µm was prepared as a base material. Then, the base material surface was polished to form depressions having a distribution of a bore diameter of 0.3 µm to 4 µm, and then an aluminum oxide layer ($AlO_x$) having a thickness of 2 nm was formed by sputtering. At this time, a target of elemental aluminum (99.99%) was used, and sputtering was carried out at a pressure of 0.007 Torr by supplying argon at a flow rate of 19 sccm and oxygen at a flow rate of 1 sccm.

Subsequently, a thin film of iron having a thickness of 2 nm that would serve as a catalyst was formed on the surface of the aluminum oxide layer by a sputtering method. In this manner, a carbon nanofiber structure was obtained in the same manner as in Example 30, except that bores having a distribution of a bore diameter of 0.3 µm to 4 µm were formed in a dispersed manner in a laminate composed of a base material, an aluminum oxide layer and an iron thin film, and the ratio of the catalyst-supported area with respect to the catalyst-supported area of Example 38 was adjusted as indicated in Table 6. In the carbon nanofiber structure thus obtained, holes having a distribution of a hole diameter of 0.3 μm to 4 μm were formed in a dispersed manner in the carbon nanofiber aggregate layer. At this time, the total area of the holes was 10% of the apparent upper end area of the carbon nanofiber structure. Furthermore, the length of the carbon nanofibers was 1250 μm.

Example 34

A carbon nanofiber structure was obtained in the same manner as in Example 33, except that the aluminum oxide layer was formed to have a thickness of 4 nm, and the ratio of the catalyst-supported area with respect to the catalyst-supported area of Example 38 was adjusted as indicated in Table 6. In the carbon nanofiber structure thus obtained, holes having a distribution of a hole diameter of 0.3 μm to 4 μm were formed in a dispersed manner in the carbon nanofiber aggregate layer. At this time, the total area of the holes was 12% of the apparent upper end area of the carbon nanofiber structure. Furthermore, the length of the carbon nanofibers was 1400 μm.

Example 35

A carbon nanofiber structure was obtained in the same manner as in Example 33, except that the aluminum oxide layer was formed to have a thickness of 8 nm, and the ratio of the catalyst-supported area with respect to the catalyst-supported area of Example 38 was adjusted as indicated in Table 6. In the carbon nanofiber structure thus obtained, holes having a distribution of a hole diameter of 0.3 μm to 4 μm were formed in a dispersed manner in the carbon nanofiber aggregate layer. At this time, the total area of the holes was 11% of the apparent upper end area of the carbon nanofiber structure. Furthermore, the length of the carbon nanofibers was 1000 μm.

Example 36

A carbon nanofiber structure was obtained in the same manner as in Example 33, except that the aluminum oxide layer was formed to have a thickness of 12 nm, and the ratio of the catalyst-supported area with respect to the catalyst-supported area of Example 38 was adjusted as indicated in Table 6. In the carbon nanofiber structure thus obtained, holes having a distribution of a hole diameter of 0.3 μm to 4 μm were formed in a dispersed manner in the carbon nanofiber aggregate layer. At this time, the total area of the holes was 10% of the apparent upper end area of the carbon nanofiber structure. Furthermore, the length of the carbon nanofibers was 140 μm.

Example 37

A carbon nanofiber structure was obtained in the same manner as in Example 33, except that the aluminum oxide layer was formed to have a thickness of 0.3 nm, and the ratio of the catalyst-supported area with respect to the catalyst-supported area of Example 38 was adjusted as indicated in Table 6. In the carbon nanofiber structure thus obtained, holes having a distribution of a hole diameter of 0.3 μm to 4 μm were formed in a dispersed manner in the carbon nanofiber aggregate layer. At this time, the total area of the holes was 10% of the apparent upper end area of the carbon nanofiber structure. Furthermore, the length of the carbon nanofibers was 140 μm.

Example 38

A plate-shaped yttria-stabilized zirconia substrate having a thickness of 1000 μm was prepared as the base material. Then, on the surface of the yttria-stabilized zirconia substrate, a thin film of iron having a thickness of 2 nm that would serve as a catalyst was formed using a sputtering method, without dispersing alumina fine particles. In this manner, a laminate composed of an yttria-stabilized zirconia substrate and an iron thin film was obtained.

Next, this laminate was accommodated in an electric furnace set at a temperature of 800° C. At this time, argon gas at atmospheric pressure was supplied to the electric furnace at a flow rate of 500 sccm.

After the temperature of the yttria-stabilized zirconia substrate to be supplied into the electric furnace was stabilized, hydrogen gas was mixed into the argon gas at a proportion of 2.5% by volume, the thin film of iron was reduced, and catalyst particles having an average particle size of 5 nm were formed on the surface of the yttria-stabilized zirconia substrate. In this manner, a structure for forming carbon nanofiber was obtained.

Next, acetylene gas was supplied into the argon gas to be supplied into the electric furnace, at a proportion of 2.5% by volume.

In this manner, carbon nanofibers were grown over 10 minutes in a direction away from the catalyst particles, and thus a carbon nanofiber aggregate layer was formed. Thus, a carbon nanofiber structure was obtained. In the carbon nanofiber structure thus obtained, holes not were formed in the carbon nanofiber aggregate layer. The length of the carbon nanofibers was 120 μm.

Example 39

A carbon nanofiber structure was obtained in the same manner as in Example 38, except that on the surface of the yttria-stabilized zirconia substrate, alumina fine particles having a diameter of 1 μm were dispersed before a thin film of iron was formed, bores having a distribution of a bore diameter of 5 μm to 12 μm were formed in a dispersed manner in the iron thin film, and also, the ratio of the catalyst-supported area with respect to the catalyst-supported area of Example 38 was adjusted as indicated in Table 6. In the carbon nanofiber structure thus obtained, holes having a distribution of a hole diameter of 5 μm to 12 μm were formed in a dispersed manner in the carbon nanofiber aggregate layer. At this time, the total area of the holes was 55% of the apparent upper end area of the carbon nanofiber structure. Furthermore, the length of the carbon nanofibers was 130 μm.

[Evaluation]
(Length of Carbon Nanofibers)

For the carbon nanofiber structures of Examples 1 to 39 and Comparative Examples 1 to 14, the length of the carbon nanofibers (CNF) was investigated by SEM observation of a cross-section of the carbon nanofiber structure. In a case in which even if a large number of carbon nanofibers were present, the carbon nanofibers did not form a structure by aggregating, the length of the carbon nanofibers was defined as zero. The results are presented in Tables 1 to 5.

(Product Quality of Carbon Nanofibers)

The product quality of the carbon nanofibers can be evaluated according to resonance Raman spectroscopy. The Raman shift appearing in the vicinity of 1590 $cm^{-1}$ in the Raman spectrum is called a graphite-derived G-band, and the Raman shift in the vicinity of 1350 $cm^{-1}$ is called as a D-band originating from the defects of amorphous carbon or graphite. As this ratio of G/D is higher, the degree of graphitization is high, and this means a high quality carbon nanofiber. Thus, the carbon nanofibers (CNF) of the carbon nanofiber structures of Examples 1 to 39 and Comparative Examples 1 to 4 and 9 were subjected to a Raman analysis, and the G/D ratio of the peaks of the G-band and the D-band originating from the structure of carbon, was determined. The results are presented in Tables 1 to 5.

(Electrochemical Characteristics 1—Reducing Characteristics)

A cell for measuring electrochemical characteristics was produced by interposing each of the carbon nanotube structures of Examples 30 to 39 between titanium meshes to work as a working electrode; using a platinum wire as a counter electrode, and using a silver/silver nitrate couple in acetonitrile as a reference electrode. Furthermore, as an electrolytic solution, a solution of 5 mM 1,2-dimethyl-3-n-propylimidazolium iodide, 2 mM iodine, and 100 mM tetra-n-butylammonium tetrafluoroborate dissolved in 3-methoxypropionitrile was prepared, and this electrolytic solution was filled in the cell. The cell for measuring electrochemical characteristics was subjected to an analysis of cyclic voltammetry of iodide ions under the conditions of room temperature and open air, and thus the reducing characteristics were evaluated. Specifically, the amount of iodide ion reduction peak current was measured. The results are presented in Table 6. Meanwhile, in Table 6, the amount of iodide ion reduction peak current per unit weight of carbon nanofibers (CNF) is indicated as a relative value calculated by taking the amount of iodide ion reduction peak current per unit weight of CNF of Example 38 as 1.

(Electrochemical Characteristics 2—Electrostatic Capacity)

A bipolar cell for measuring electric double layer capacity was produced by interposing a separator between two sheets of each of the carbon nanotube structures of Examples 30 to 39 to obtain a laminate, interposing this laminate between titanium meshes, further interposing the resultant between two sheets of glass plates, and fixing the assembly. This cell was immersed in a 1 mol/L dehydrated electrolytic solution obtained by dissolving tetraethylammonium tetrafluoroborate ($Et_4NBF_4$) in propylene carbonate (PC) (trade name: CAPASOLVE CPG-00005, manufactured by Kishida Chemical Co., Ltd.), and the electrostatic capacity was measured. The results are presented in Table 6. Meanwhile, in Table 6, the electrostatic capacity per unit weight of carbon nanofibers (CNF) is indicated as a relative value calculated by taking the electrostatic capacity per unit weight of CNF of Example 38 as 1.

TABLE 1

| | Material of base material | Metal oxide layer | Thickness of metal oxide layer [nm] | Catalyst | Form of supply of oxygen gas | Length of CNF [μm] | Quality of CNF [G/D peak ratio] |
|---|---|---|---|---|---|---|---|
| Example 1 | Yttria-stabilized zirconia | $AlO_X$ | 2 | Fe | Not supplied | 1150 | 3.2 |
| Example 2 | Yttria-stabilized zirconia | $AlO_X$ | 4 | Fe | Not supplied | 1300 | 3.3 |
| Example 3 | Yttria-stabilized zirconia | $AlO_X$ | 8 | Fe | Not supplied | 900 | 3.2 |
| Example 4 | Yttria-stabilized zirconia | $AlO_X$ | 10 | Fe | Not supplied | 350 | 3.2 |
| Example 5 | Yttria-stabilized zirconia | $AlO_X$ | 20 | Fe | Not supplied | 100 | 3.1 |
| Example 6 | Yttria-stabilized zirconia | $AlO_X$ | 0.5 | Fe | Not supplied | 210 | 3.2 |
| Example 7 | Yttria-stabilized zirconia | $AlO_X$ | 2 | Fe | Supplied through back surface | 1350 | 3.2 |
| Example 8 | Yttria-stabilized zirconia | $AlO_X$ | 4 | Fe | Supplied through back surface | 1500 | 3.2 |
| Example 9 | Yttria-stabilized zirconia | $AlO_X$ | 8 | Fe | Supplied through back surface | 1100 | 3.3 |
| Example 10 | Yttria-stabilized zirconia | $AlO_X$ | 10 | Fe | Supplied through back surface | 500 | 3.2 |

TABLE 2

| | Material of base material | Metal oxide layer | Thickness of metal oxide layer [nm] | Catalyst | Form of supply of oxygen gas | Length of CNF [μm] | Quality of CNF [G/D peak ratio] |
|---|---|---|---|---|---|---|---|
| Example 11 | Yttria-stabilized zirconia | $AlO_X$ | 20 | Fe | Supplied through back surface | 100 | 3.2 |
| Example 12 | Yttria-stabilized zirconia | $AlO_X$ | 0.5 | Fe | Supplied through back surface | 200 | 2.9 |
| Example 13 | Strontium titanate | $AlO_X$ | 2 | Fe | Not supplied | 410 | 3.2 |
| Example 14 | Calcia-stabilized zirconia | $AlO_X$ | 2 | Fe | Not supplied | 740 | 3.2 |
| Example 15 | Yttria-stabilized zirconia | $AlO_X$ | 2 | Fe | Supplied as a mixture into atmosphere | 1200 | 3 |
| Example 16 | Yttria-stabilized zirconia | $AlO_X$ | 2 | Fe | Supplied from both back surface and atmosphere | 1400 | 3 |
| Example 17 | Yttria-stabilized zirconia | $AlO_X$ | 2 | Ni | Not supplied | 410 | 2.7 |
| Example 18 | Yttria-stabilized zirconia | $AlO_X$ | 2 | Co | Not supplied | 360 | 2.8 |
| Example 19 | Yttria-stabilized zirconia | $AlO_X$ | 2 | FeMo | Not supplied | 890 | 3.0 |
| Example 20 | Yttria-stabilized zirconia | $MgAl_2O_4$ | 2 | Fe | Not supplied | 720 | 3.1 |

TABLE 3

| | Material of base material | Metal oxide layer | Thickness of metal oxide layer [nm] | Catalyst | Form of supply of oxygen gas | Length of CNF [μm] | Quality of CNF [G/D peek ratio] |
|---|---|---|---|---|---|---|---|
| Example 21 | Yttria-stabilized zirconia | MgO | 2 | Fe | Not supplied | 640 | 3.1 |
| Example 22 | Yttria-stabilized zirconia | CeO$_2$ | 2 | Fe | Not supplied | 550 | 3.1 |
| Example 23 | Yttria-stabilized zirconia | AlO$_X$ | 1 | Fe | Not supplied | 450 | 3.2 |
| Comparative Example 1 | Silicon | AlO$_X$ | 2 | Fe | Not supplied | 60 | 3.3 |
| Comparative Example 2 | Titanium | AlO$_X$ | 2 | Fe | Not supplied | 40 | 2.6 |
| Comparative Example 3 | Aluminum oxide | AlO$_X$ | 2 | Fe | Not supplied | 60 | 3.2 |
| Comparative Example 4 | Aluminum oxide | AlO$_X$ | 2 | Fe | Supplied through back surface | 60 | 3.2 |
| Comparative Example 5 | Titanium | AlO$_X$ | 0.3 | Fe | Not supplied | 0 | — |
| Comparative Example 6 | Silicon | AlO$_X$ | 0.3 | Fe | Not supplied | 0 | — |

TABLE 4

| | Material of base material | Metal oxide layer | Thickness of metal oxide layer [nm] | Catalyst | Form of supply of oxygen gas | Length of CNF [μm] | Quality of CNF [G/D peek ratio] |
|---|---|---|---|---|---|---|---|
| Example 24 | Yttria-stabilized zirconia | — | — | Fe | Not supplied | 120 | 3.0 |
| Example 25 | Strontium titanate | — | — | Fe | Not supplied | 110 | 3.0 |
| Example 26 | Yttria-stabilized zirconia | — | — | Fe | Supplied through back surface | 120 | 3.0 |
| Example 27 | Yttria-stabilized zirconia | — | — | Ni | Not supplied | 100 | 2.7 |
| Example 28 | Yttria-stabilized zirconia | — | — | Co | Not supplied | 90 | 2.8 |
| Example 29 | Yttria-stabilized zirconia | — | — | FeMo | Not supplied | 110 | 3.0 |
| Comparative Example 7 | Silicon | — | — | Fe | Not supplied | 0 | — |
| Comparative Example 8 | titanium | — | — | Fe | Not supplied | 0 | — |
| Comparative Example 9 | Aluminum oxide | — | — | Fe | Not supplied | 60 | 3.2 |

TABLE 5

| | Material of base material | Metal oxide layer | Thickness of metal oxide layer [nm] | Catalyst | Form of supply of oxygen gas | Length of CNF [μm] | Quality of CNF [G/D peek ratio] |
|---|---|---|---|---|---|---|---|
| Example 30 | Yttria-stabilized zirconia | — | — | Fe | Not supplied | 130 | 3.0 |
| Example 31 | Yttria-stabilized zirconia | — | — | Fe | Not supplied | 130 | 3.2 |
| Example 32 | Yttria-stabilized zirconia | — | — | Fe | Not supplied | 140 | 3.0 |
| Example 33 | Yttria-stabilized zirconia | AlO$_X$ | 2 | Fe | Not supplied | 1250 | 3.2 |
| Example 34 | Yttria-stabilized zirconia | AlO$_X$ | 4 | Fe | Not supplied | 1400 | 3.2 |
| Example 35 | Yttria-stabilized zirconia | AlO$_X$ | 8 | Fe | Not supplied | 1000 | 3.2 |
| Example 36 | Yttria-stabilized zirconia | AlO$_X$ | 12 | Fe | Not supplied | 140 | 3.0 |
| Example 37 | Yttria-stabilized zirconia | AlO$_X$ | 0.3 | Fe | Not supplied | 140 | 3.0 |
| Example 38 | Yttria-stabilized zirconia | — | — | Fe | Not supplied | 120 | 3.0 |
| Example 39 | Yttria-stabilized zirconia | — | — | Fe | Not supplied | 130 | 3.0 |

TABLE 6

| | Hole diameter (μm) | Proportion of total area of holes with respect to upper end surface area of CNF aggregate layer (%) | Catalyst-supported area (relative to Example 38 as 1) | CNF length (relative to Example 38 as 1) | Electrochemical characteristics 1 (DSC) Amount of iodide ion reduction peak current per unit weight of CNF (relative to Example 38 as 1) | Electrochemical characteristics 2 (Electric double layer capacitor) Electrostatic capacity per unit weight of CNF (relative to Example 38 as 1) |
|---|---|---|---|---|---|---|
| Example 30 | 0.7~5 | 8 | 0.92 | 1.1 | 1.06 | 1.1 |
| Example 31 | 0.7~3 | 1 | 0.99 | 1.1 | 1.03 | 1.1 |
| Example 32 | 2~7 | 39 | 0.61 | 1.2 | 1.08 | 1.1 |
| Example 33 | 0.3~4 | 10 | 0.90 | 10.4 | 1.06 | 1.1 |
| Example 34 | 0.3~4 | 12 | 0.88 | 11.7 | 1.06 | 1.1 |
| Example 35 | 0.3~4 | 11 | 0.89 | 8.3 | 1.04 | 1.1 |

TABLE 6-continued

|  | Hole diameter (μm) | Proportion of total area of holes with respect to upper end surface area of CNF aggregate layer (%) | Catalyst-supported area (relative to Example 38 as 1) | CNF length (relative to Example 38 as 1) | Electrochemical characteristics 1 (DSC) Amount of iodide ion reduction peak current per unit weight of CNF (relative to Example 38 as 1) | Electrochemical characteristics 2 (Electric double layer capacitor) Electrostatic capacity per unit weight of CNF (relative to Example 38 as 1) |
|---|---|---|---|---|---|---|
| Example 36 | 0.3~4 | 10 | 0.90 | 1.2 | 1.03 | 1.1 |
| Example 37 | 0.3~4 | 10 | 0.90 | 1.2 | 1.03 | 1.1 |
| Example 38 | — | 0 | 1 | 1.0 | 1 | 1 |
| Example 39 | 5~12 | 55 | 0.45 | 1.1 | 0.95 | 0.9 |

From the results shown in Tables 1 to 3, it was found that the carbon nanofibers in the carbon nanofiber structures of Examples 1, 13 and 14 were sufficiently lengthened as compared with the carbon nanofibers in the carbon nanofiber structures of Comparative Examples 1, 2 and 3. From this, it is speculated that when a metal catalyst is supported on a base material with a metal oxide layer interposed therebetween, incorporating an oxide having oxygen ion conductivity to the base material has contributed to sufficient growth of the carbon nanofibers.

From the results shown in Tables 1 to 3, it was found that the carbon nanofibers in the carbon nanofiber structures of Examples 1 and 7 were sufficiently lengthened as compared with the carbon nanofibers in the carbon nanofiber structures of Comparative Examples 3 and 4. From this, it is speculated that when a metal catalyst is supported on a base material with a metal oxide layer interposed therebetween, incorporating an oxide having oxygen ion conductivity to the base material, irrespective of the method of supplying a gas containing oxygen, has contributed to sufficient growth of the carbon nanofibers.

From the results shown in Tables 1 to 3, it was found that the carbon nanofibers in the carbon nanofiber structures of Examples 1 to 6 vary greatly depending on the thickness of the metal oxide layer, and if the thickness is 0.5 nm to 10 nm, the length of CNF is larger than 100 μm and is sufficiently long. From this, it is speculated that when a metal catalyst is supported on a base material containing an oxide having oxygen ion conductivity, with a metal oxide layer interposed therebetween, if the thickness of the metal oxide layer is in the range described above, the influence of oxygen ions from the base material having oxygen ion conductivity can be more easily transferred. Therefore, it is contemplated that when an oxide having oxygen ion conductivity is incorporated into the base material, providing a metal oxide layer having a thickness in a certain range has contributed to more satisfactory growth of the carbon nanofibers.

From the results shown in Tables 1 to 3, it was found that the carbon nanofibers in the carbon nanofiber structures of Examples 7 to 12 are, in many cases, longer than Examples 1 to 6. From this, it is speculated that when a metal catalyst is supported on a base material containing an oxide having oxygen ion conductivity, with a metal oxide layer being interposed therebetween, controlling the amount of oxygen supply through the surface on the opposite side of the metal oxide layer provided on the base material having oxygen ion conductivity, has contributed to more satisfactory growth of the carbon nanofibers.

From the results shown in Table 4, it was found that the carbon nanofibers in the carbon nanofiber structure of Examples 24 to 29 are sufficiently longer compared with the carbon nanofibers in the carbon nanofiber structures of Comparative Examples 7 to 9. From this, it is speculated that when a metal catalyst is supported directly on a base material, incorporating an oxide having oxygen ion conductivity into the base material has contributed to satisfactory growth of carbon nanotubes.

From the results shown in Table 5, it was found that the carbon nanofibers in the carbon nanofiber structures of Examples 30 to 37 and 39 are sufficiently longer compared with the carbon nanofibers in the carbon nanofiber structures of Example 38. From this, it is speculated that when a metal catalyst is supported on a base material, providing appropriate holes in a dispersed manner in the base material has contributed to satisfactory growth of carbon nanotubes.

From the results shown in Table 6, it was found that the cells for measuring electrochemical characteristics according to Examples 30 to 37 did not exhibit any significant changes in the reduction potential as compared with the cell for measuring electrochemical characteristics according to Example 38, but the amount of reduction peak current per unit weight of the carbon nanofibers used sufficiently increased.

This is speculated to be because when holes are appropriately formed in the carbon nanofiber aggregate layer, transport of the electrolytic solution into the interior of the carbon nanofiber aggregate layer is improved, so that a reduction reaction may easily occur not only at the surface layer but also in the interior of the carbon nanofiber aggregate layer, and the reduction peak current has improved. In addition, as in the case of Example 39, even if the carbon nanofibers were lengthened as a result of the effect of holes, when holes having large hole diameters were formed, the amount of reduction peak current per unit weight of the carbon nanofibers was decreased, and this resulted in that internal diffusion of the electrolytic solution was rather deteriorated. This is speculated to be because the density of the carbon nanofibers decreased, the strength of the carbon nanofiber aggregate layer was insufficient for constituting a cell for measuring electrochemical characteristics, and the carbon nanofibers were destroyed.

Furthermore, it was found that the bipolar cells for measuring electric double layer capacity according to Examples 30 to 37 had sufficiently larger electrostatic capacities per unit weight of the carbon nanofibers, as compared with the bipolar cell for measuring electric double layer capacity according to Example 38.

This is speculated to be because when holes are appropriately formed in the carbon nanofiber aggregate layer, transport of the electrolytic solution into the interior of the layer is improved, and thereby, not only the outermost layer but also the interior of the carbon nanofiber aggregate layer can be effectively utilized.

From the above results, it was confirmed that according to the structure for forming carbon nanofibers of the present invention, carbon nanofibers can be grown satisfactorily.

EXPLANATIONS OF REFERENCE NUMERALS

10 BASE MATERIAL
20 METAL OXIDE LAYER
20A THINNER SECTION
20B THICKER SECTION
30 METAL CATALYST
40, 340, 440 STRUCTURE FOR FORMING CARBON NANOFIBER
50, 450 CARBON NANOFIBER
100, 200, 300, 400, 500 CARBON NANOFIBER STRUCTURE
400, 500 CARBON NANOFIBER STRUCTURE
411 BORE
420 METAL OXIDE LAYER
201, 451 CARBON NANOFIBER AGGREGATE LAYER
451a END SURFACE
452 HOLE

The invention claimed is:

1. A structure for forming carbon nanofiber, comprising:
 a plate-shaped base material consisting of an oxygen ion-conductive oxide;
 a metal catalyst provided on one surface side of the base material; and
 a metal oxide layer formed of a metal oxide, between the one surface of the base material and the metal catalyst,
 wherein the thickness of the metal oxide layer is 1 nm to 10 nm, and
 the metal oxide layer is provided directly on the one surface of the base material.

2. The structure for forming carbon nanofiber according to claim 1, wherein the metal oxide is aluminum oxide.

3. The structure for forming carbon nanofiber according to claim 2, wherein the metal catalyst includes iron.

4. The structure for forming carbon nanofiber according to claim 3, wherein the base material includes zirconia.

5. The structure for forming carbon nanofiber according to claim 1, wherein the thickness of the metal oxide layer is 1 nm to 8 nm.

6. The structure for forming carbon nanofiber according to claim 1, wherein the metal oxide layer comprises plural thinner sections separated from each other by thicker sections of metal oxide having a thickness of larger than 10 nm.

7. The structure for forming carbon nanofiber according to claim 1, wherein the metal catalyst is at least one selected from the group consisting of V, Mo, Fe, Co, Ni, Pd, Pt, Rh, Ru and W.

8. A carbon nanofiber structure, comprising the structure for forming carbon nanofiber according to claim 1, and carbon nanofibers that are provided on the metal catalyst of the structure for forming carbon nanofiber, the carbon nanofibers being obtainable by growing carbon nanofibers by supplying a raw material gas containing carbon to the metal catalyst of the structure for forming carbon nanofiber by a chemical vapor deposition method.

9. The carbon nanofiber structure according to claim 8, obtainable by growing carbon nanofibers by supplying a gas containing oxygen molecules to the structure for forming carbon nanofiber through a surface of the metal catalyst on the opposite side of the base material.

10. A carbon nanofiber structure, comprising:
 the structure for forming carbon nanofiber according to claim 1; and
 a carbon nanofiber aggregate layer that is provided on the side of the one surface of the base material of the structure for forming carbon nanofiber so as to interpose at least the metal catalyst between the carbon nanofiber aggregate layer and the one surface, and is formed by aggregating plural strands of carbon nanofibers that are oriented along a direction away from the one surface,
 wherein holes each having a hole diameter of 0.3 µm to 7 µm are formed by being surrounded by the plural strands of carbon nanofibers, and
 in the carbon nanofiber aggregate layer, the total area of the holes is more than or equal to 1% and less than 40% relative to the apparent area of the end surface on the opposite side of the base material in the carbon nanofiber aggregate layer.

11. The carbon nanofiber structure according to claim 10, wherein the length of the carbon nanofibers is larger than the maximum value of the hole diameter of the holes.

12. The carbon nanofiber structure according to claim 10, wherein the holes are through-holes.

13. A carbon nanofiber electrode, obtained by transferring the carbon nanofiber aggregate layer of the carbon nanofiber structure according to claim 8, to a conductive substrate.

14. A method for producing a carbon nanofiber structure, the method comprising a carbon nanofiber growing step of growing carbon nanofibers by a chemical vapor deposition method on the metal catalyst of the structure for forming carbon nanofiber according to claim 1, and thereby obtaining a carbon nanofiber structure,
 wherein the carbon nanofiber growing step is carried out by supplying a raw material gas containing carbon.

15. The method for producing a carbon nanofiber structure according to claim 14, wherein in the carbon nanofiber growing step, a gas containing oxygen molecules is supplied to the base material of the structure for forming carbon nanofiber, through the surface on the opposite side of the metal catalyst.

16. The method for producing a carbon nanofiber structure according to claim 14, wherein the oxygen ion-conductive oxide is a high temperature oxygen ion-conductive oxide capable of conducting oxygen ions at a high temperature of 500° C. or higher, and in the carbon nanofiber growing step, the structure for forming carbon nanofiber is heated to 500° C. or higher.

17. A method for producing a carbon nanofiber structure, the method comprising:
 a preparation step of preparing the structure for forming carbon nanofiber according to claim 1; and
 a carbon nanofiber growing step of forming a carbon nanofiber structure having a carbon nanofiber aggregate layer on the metal catalyst of the structure for forming carbon nanofiber that is formed by supplying a raw material gas containing carbon to the metal catalyst by a chemical vapor deposition method, orienting plural strands of carbon nanofibers along a direction away from one surface of the base material, and thereby aggregating the plural strands of carbon nanofibers,
 wherein bores that are formed on the metal catalyst side in the structure for forming carbon nanofiber and each have a bore diameter of 0.3 µm to 7 µm, are formed such that the total area of the bores is more than or equal to 1% and less than 40% relative to the area of the catalyst-supported surface on which the metal catalyst is provided.

18. The method for producing a carbon nanofiber structure according to claim 17, wherein in the preparation step, the bores in the structure for forming carbon nanofiber are obtained by forming openings in the one surface of the base material, and forming the metal catalyst on the regions excluding the openings in the one surface of the base material.

* * * * *